United States Patent [19]
Klein

[11] 3,720,814
[45] March 13, 1973

[54] DIRECT NUMERICAL CONTROL SYSTEM

[75] Inventor: John Klein, Fairview Park, Ohio

[73] Assignee: The Warner & Swasey Company, Cleveland, Ohio

[22] Filed: Sept. 18, 1970

[21] Appl. No.: 73,567

[52] U.S. Cl. ............235/151.11, 235/152, 318/569, 318/573
[51] Int. Cl. ...............................................G06f 15/46
[58] Field of Search ..235/151.11, 152; 318/569, 573

[56] References Cited

UNITED STATES PATENTS

| | | | |
|---|---|---|---|
| 3,573,738 | 4/1971 | Bottles et al. | 235/151.11 X |
| 3,416,056 | 12/1968 | Motooka et al. | 235/151.11 X |
| 3,254,203 | 5/1966 | Kveim | 235/151.11 X |
| 3,465,298 | 9/1969 | Duke et al. | 318/573 X |
| 3,473,157 | 10/1969 | Little et al. | 318/573 X |
| 3,544,972 | 12/1970 | Trousdale | 235/151.11 X |

Primary Examiner—Malcolm A. Morrison
Assistant Examiner—James F. Gottman
Attorney—Yount and Tarolli

[57] ABSTRACT

A control system for a plurality of numerically controlled machine tools having a coarse interpolator for generating from parametric data a plurality of signals defining the absolute magnitude of vector components along two orthogonal axes of a plurality of straight line segments closely approximating a mathematical curve defined by the parametric data. Multiplex hardware is provided for time-sharing the coarse interpolator among the plurality of machine tools, a digital computer supplies the coarse interpolator with the parametric data and acts as high-speed buffer storage to assist in time-sharing the coarse interpolator, and data link equipment is provided for transmitting signals between the controls of the plurality of the machine tools and the coarse interpolator or the computer.

9 Claims, 21 Drawing Figures

INVENTOR
JOHN KLEIN
BY Yount and Tarolli
ATTORNEYS

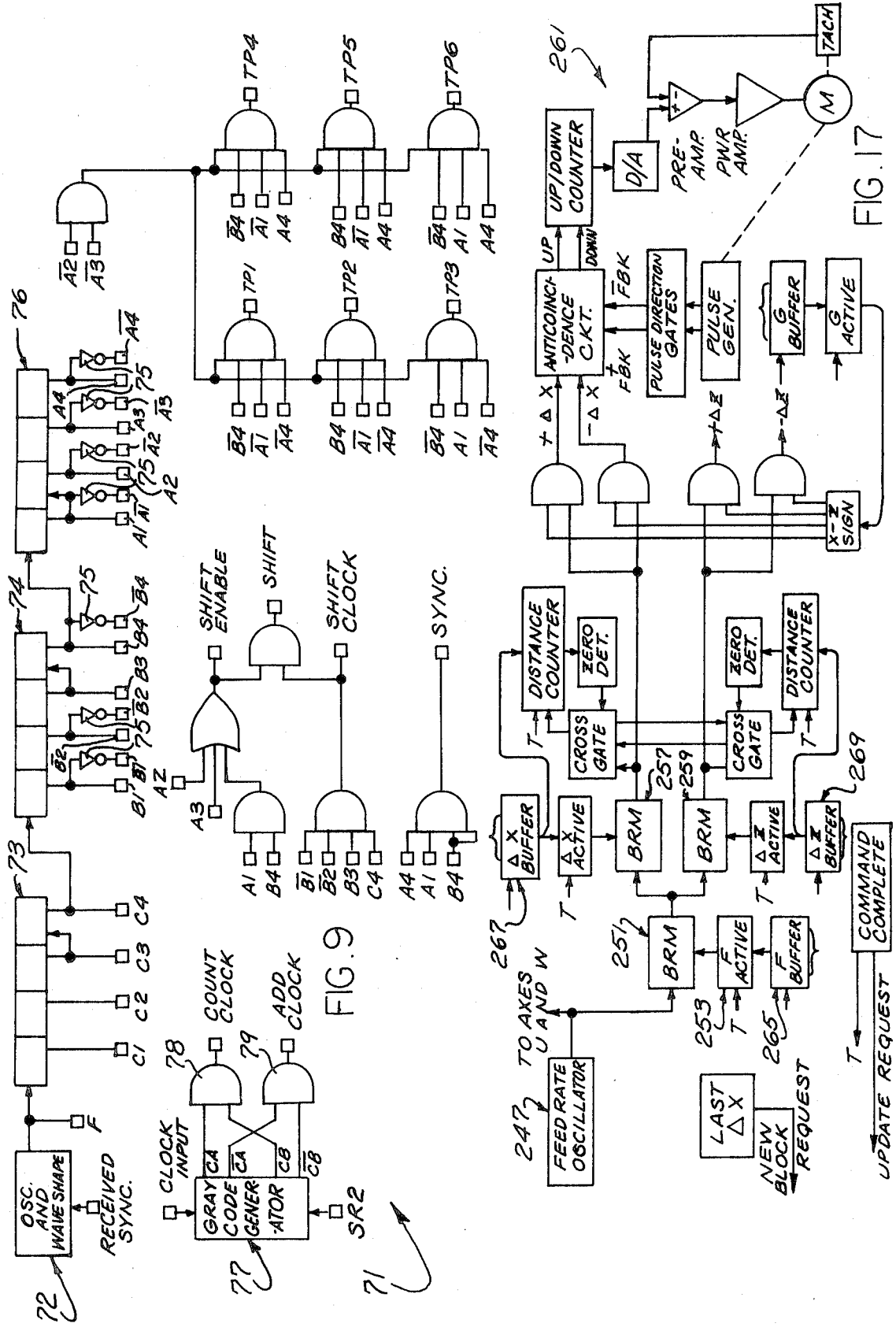

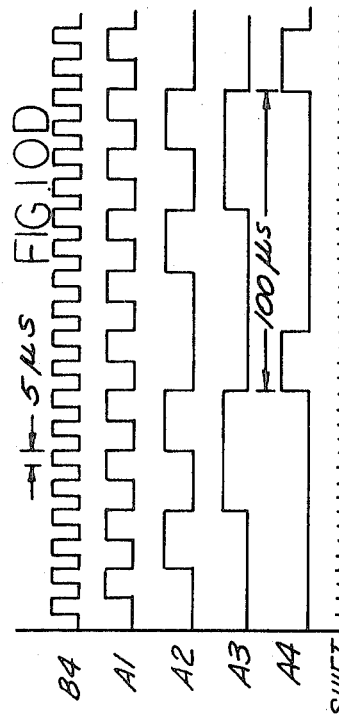
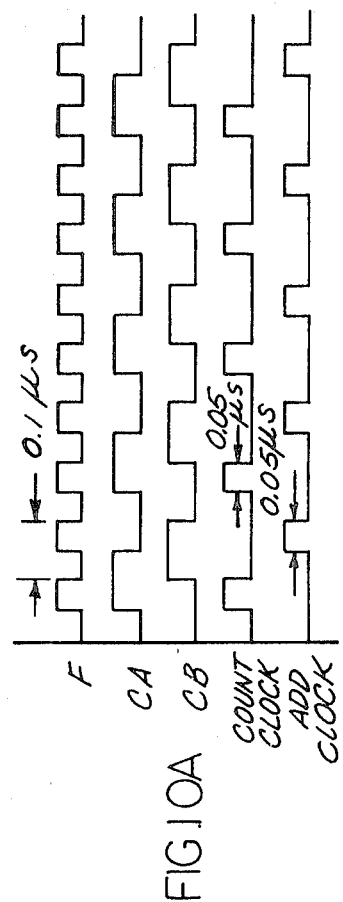
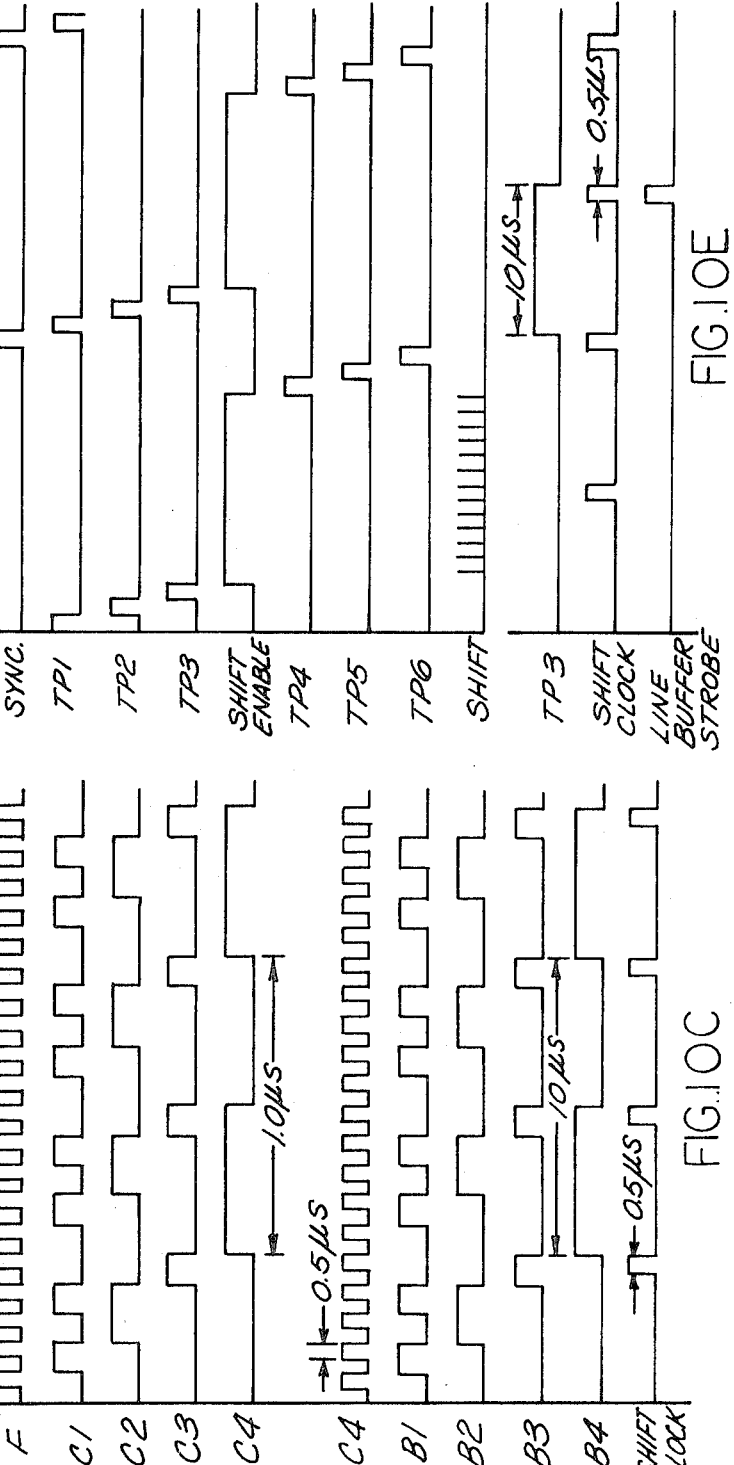

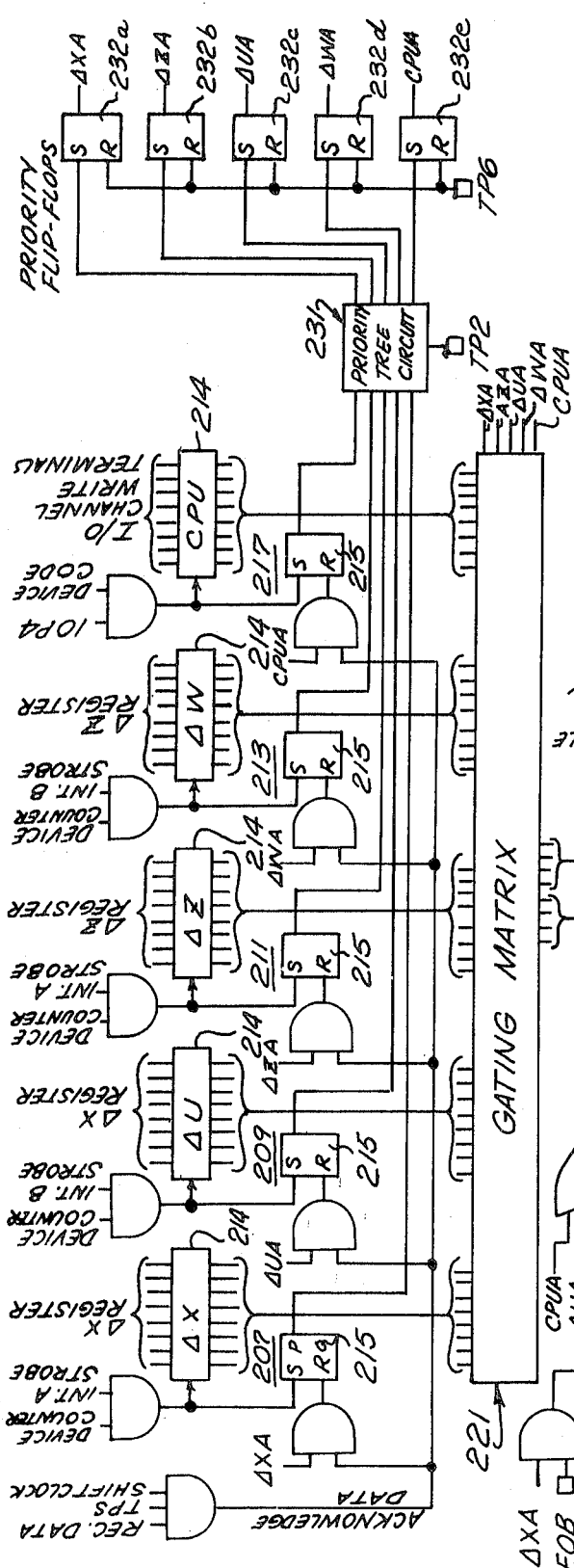
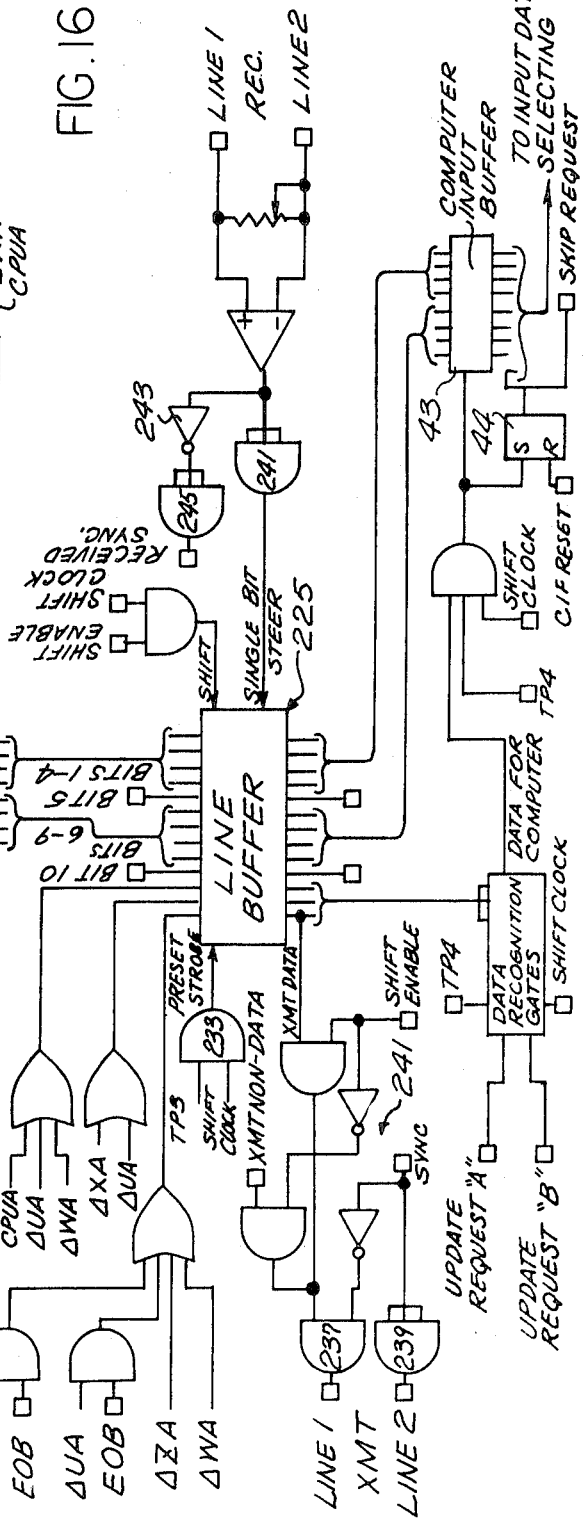
FIG. 16

DIRECT NUMERICAL CONTROL SYSTEM

The present invention relates to a control system for a plurality of numerically controlled machine tools, particularly a system which utilizes a central data processor to control the machines in accordance with data stored in the processor.

One problem in controlling a plurality of machine tools from a central data processor, such as a general purpose computer, is that the number of machines which can be controlled by the processor has heretofore been limited if the processor is used to interpolate, from parametric data, a binary signal defining the absolute magnitude of vector components along orthogonally related axes for causing a movable member of the machine tool, such as the cutting tool, to move along a path which approximates a mathematical curve defined by the parametric data. If this interpolation is not done in the central processor, each machine tool must be provided with an interpolator capable of generating the signals for defining the absolute magnitude of the vector components necessary to move the member, such as a tool, through a plurality of straight line segments which approximate a desired path.

Accordingly, an object of the present invention is to provide a new and improved control system for controlling a plurality of machine tools from a computer which has programs stored therein for producing different workpieces in which a high speed special purpose data processor performs circular interpolation under the control of the computer to relieve the computer of this normally time consuming task and to eliminate the need for such an interpolator in each machine.

A still further object of the present invention is to provide a new and improved control system as in the preceding object in which the high speed special purpose data processor is also utilized to perform linear interpolation to move the movable member of the machine tool along a linear path.

Another object of the present invention is to provide a new and improved control system for a plurality of machine tools in which a data processing operation, such as circular interpolation, which limits the number of machines which can be controlled by a main central data processor that stores command to be executed by the machines and directs the operation of the machines, is done by a central special purpose data processor under the control of the main processor with the special purpose processor operating at a rate such that the number of machines which the main central data processor can control is significantly increased with the main central data processor preferably acting as a high-speed buffer storage for the central special purpose data processor.

A further object of the present invention is to provide a new and improved control system for controlling a plurality of machine tools from a central processor having commands stored therein for effecting desired operations of machine tools and wherein interpolation for generating binary signals indicating the absolute magnitude of vector components for moving a movable member along a plurality of straight line segments to follow or closely approximate a mathematical curve defined by parametric data stored in a main central processor for controlling the machines is performed by a central high-speed special purpose data processor operating at higher clock speeds than the main processor and central processor in accordance with data supplied from the main central data processor with special purpose processor computing the straight line segments one segment at a time and transmitting the information to the machine tool for generating the segment and awaiting a request for more information from the machine and main central processor before computing the absolute magnitude of the vector components for the next segment, the special purpose processor utilizing the central data processor as a buffer storage for information relating to the genration of the remaining segments thereby freeing the special purpose processor for use to compute segment components for other machine tools while commands for a computed segment is being executed by a machine.

A further object of the present invention is to provide a new and improved system for effecting circular interpolation for controlling the path of a movable member of a machine tool whereby information which must be stored and supplied to effect the interpolation is minimized and whereby the interpolation may be done at a high rate of speed to obtain a plurality of signals which define the absolute magnitude of the vector components of a plurality of straight line segments closely approximating a mathematical curve defined by stored parametric data.

A still further object of the present invention is to provide a new and improved control system for a machine tool in which circular or linear interpolation for providing a plurality of signals defining the absolute magnitude of vector components of a plurality of straight line segments closely approximating a mathematical curve, such as a circle, is performed by summing increments representing displacements with respect to orthogonal axes of the vector components.

Further objects of the present invention will be apparent from the following detail description of a specific form of the preferred embodiment in which:

FIG. 9 is a schematic block diagram showing the digital clock of the present invention;

FIG. 10A, 10B, 10C, 10D and 10E are graphical illustrations of the waveforms of the signals produced by the digital clock;

FIG. 16 is a schematic block diagram of the data length at the central control for one of the machine tools of the system; and FIG. 17 is a partial diagram of a machine tool control and servo drives.

Figure 2:
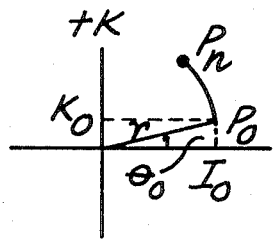
FIG. 2 is a geometric illustration of a portion of the circle arc of FIG. 1 translated to I and K coordinates.

While the present invention is susceptible of various forms and modifications and of use to control various machines, e.g., a drafting machine, it is particularly useful in controlling machines and will be described with reference thereto.

In the field of numerical control of machine tools, it is desirable to minimize or abbreviate the length and number of commands, or input data, required to direct a cutting tool or other device over a desired path. For example, nearly everyone is familiar with the process of plotting a curve from a mathematical expression. The more points that are plotted over a given range of values, the more accurately the plotted curve will follow the true curve. Thus, the greater the accuracy, the more data required. For the desired accuracy, 10,000 coordinate dimensions may be required in an inch of travel. Where, however, the desired curve may be described by a relatively simple mathematical expression, it is possible to greatly reduce the quantity of input data to the control system. This is accomplished by building the control system so that it can generate a desired curve in response to input data consisting only of parameters of the desired curve rather than a large number of coordinate dimensions.

Control systems capable of such curve generation are known in the art and are generally referred to as continuous path contouring control systems. Two mathematical curves are commonly employed; the straight line and the circle arc, the latter of which may be generated in either the clockwise or counter-clockwise direction.

The circuitry for generating circle arcs is somewhat more complex than that required to generate straight lines. Therefore, where several machine tools are to be controlled by a central control facility, it is advantageous to time share the circular interpolating circuitry. This has not been possible in prior art control systems because interpolation has been carried out in real time, thus requiring a dedicated interpolator for each pair of axes.

The present invention separates the interpolator function between two circuit means, a coarse interpolator and a fine interpolator. The coarse interpolator is capable of either linear or circular interpolation and is time shared among a plurality of machine tool axis pairs. The fine interpolator is capable of linear interpolation only and one fine interpolator is dedicated to each machine tool axis pair served by the coarse interpolator.

Briefly, the coarse interpolator generates a series of displacement commands that are serially executed by the fine interpolator. The fine interpolator operates in real time and therefore operates at a clock frequency proportional to tool feedrate. The coarse interpolator operates at a clock rate many times higher than the maximum feedrate of any axis pair it serves, and therefore is capable of generating displacement commands for a plurality of axis pairs while one axis pair is being moved in accordance with a previously generated displacement command.

Freeing the coarse interpolator from a clock rate dependent upon tool feedrate permits the use of circuitry that provides more accuracy than rate multipliers and far greater speed than digital differential analyzers. The terminal coordinates of each linear displacement command generated by the coarse interpolator will never be more than one control increment from the true curve. Furthermore, the maximum deviation from the true curve of the linear displacement commanded by the coarse interpolator may be limited to any desired distance.

For a complete understanding of the functions of the present invention, the mathematical derivation and step-by-step generation of a circular arc will first be discussed. This will then be related to the capabilities of the control system, and finally, the nature, description, and functions of the apparatus will be presented.

Figure 1:
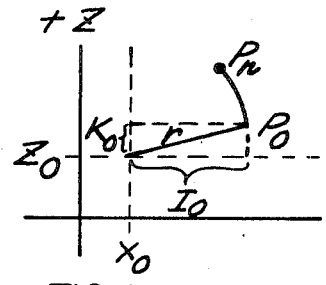
FIG. 1 is a geometric illustration of a portion of a circle arc and X and Z coordinates.

The equation of a circle of radius $r$ in a cartesian coordinate system in X and Z as shown in FIG. 1 is $$r^2 = (x - x_0)^2 + (z - z_0)^2 \qquad (1)$$

where $(x_0, z_0)$ are the coordinates of the center of the circle and $r$ is the radius.

Taking partial derivatives of equation 1 yields $$2r dr = 2(x - x_0) d(x - x_0) + 2(z - z_0) d(z - z_0) \qquad (2)$$

and, because $x_0$ and $z_0$ are constants, $dx_0$ and $dz_0$ are zero. Therefore, $$2r dr = 2(x - x_0) dx - 2(x - x_0) dx_0 \qquad (3)$$
$$+ 2(z - z_0) dz - 2(z - z_0) dz_0$$

$$2r dr = 2(x - x_0) dx + 2(z - z_0) dz$$

and finally, $$r dr = (x - x_0) dx + (z - z_0) dz \qquad (4)$$

Direct integration of equation 4 would involve first order terms in $x$ and $z$. In order to eliminate these terms, and thereby simplify the mathematics involved, the axes are translated to variables in I and K as shown in FIGS. 1 and 2, where $I = (x - x_0)$ and $K = (z - z_0)$. It follows that $dI = dx$ and $dK = dz$. Equation 4 may now be rewritten as $$r dr = I dI + K dK \qquad (5)$$

Integrating equation 5 yields the indefinite integral $$\tfrac{1}{2}r^2 = \tfrac{1}{2}I^2 + \tfrac{1}{2}K^2 + \tfrac{1}{2}C$$

$$r^2 = I^2 + K^2 + C$$

where $C$ is the constant of integration. $C$, of course, falls out in the definite integral and we have $$r^2 = I^2 + K^2$$

which will be recognized as the equation of a circle of radius $r$ having its center at the origin of a cartesian coordinate system in $I$ and $K$. Therefore, step-by-step integration of equation 5 will generate a circle arc of the desired shape. It then would only be necessary to re-translate the axes to properly locate the arc in the $X$, $Z$ coordinate system. This might be required in an absolute positioning system, but probably would not be required in an incremental positioning system. These terms are well understood by those skilled in the art and it will be appreciated that the letters chosen to represent the several variables and constants are the ones generally used in the field of numerical control.

By definition, the radius $r$ = constant, and therefore, $dr = 0$. Thus, for points on the true circle arc, $dr = 0$ and equation 5 can be re-written $$0 = IdI + KdK \quad (6)$$

and, solving equation 6 for $dK$, $$dK = -I/K\,(dI) \quad (7)$$

Figure 3:
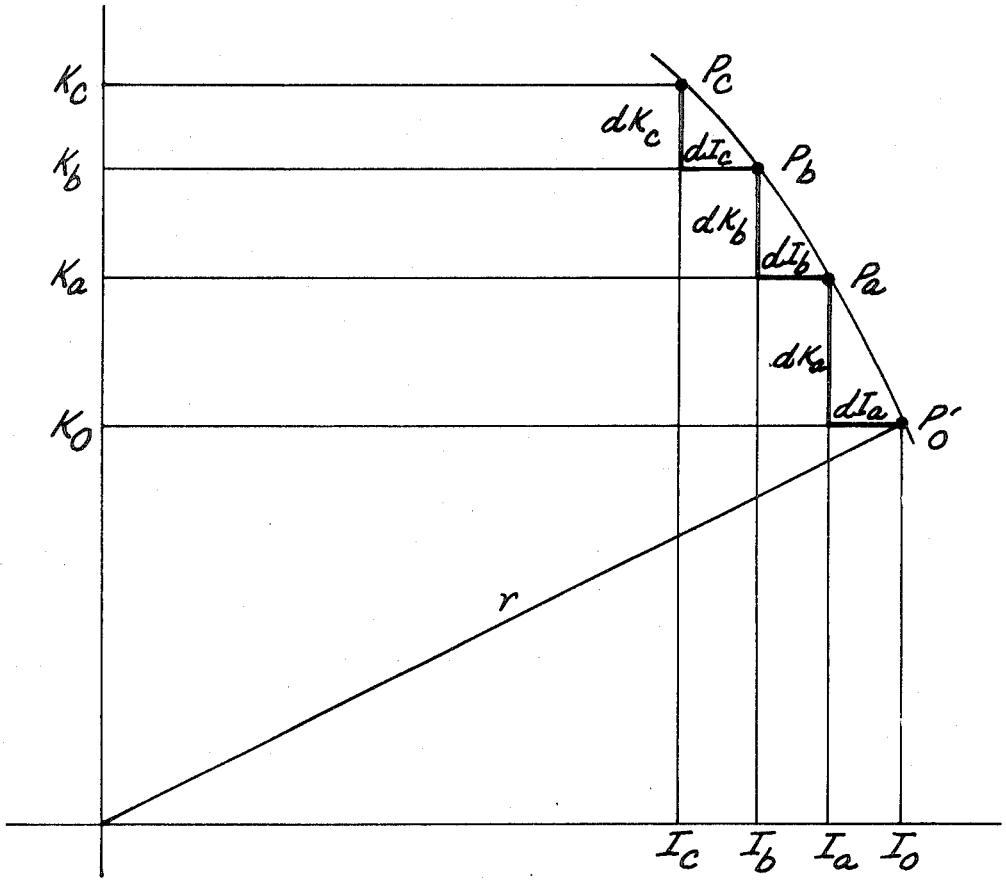
FIG. 3 is an enlarged geometric illustration of the portion of the circle arc of FIG. 2 showing the steps of graphical integration to produce the portion of the circle arc.

The physical interpretation of equation 7 is that if from a point on the true curve a movement $dI$ is made in the I-axis, it is necessary to move a distance $dK$ equal to $I/K\,(dI)$ in the K-axis to get back on the true curve. This is the basis for graphical or step-by-step integration. From an initial point $(I_o, K_o)$, the independent variable $I$ is incremented or decremented an amount $dI$, which is chosen small enough to provide the desired accuracy. This is illustrated in FIG. 3 which shows a portion of the circle defined by equation 6. It will be seen from FIG. 3 that the magnitude of $dI$ has been made constant. That is, $dI_a = dI_b = dI_c$. The magnitude of $dK$, however, is a function of $I$ and $K$ as well as of $dI$. Therefore, the magnitude of $dK$ will depend upon the particular point on the arc being generated. Thus, in step-by-step fashion, with reference to FIG. 3, and starting at point $P_o$ on the arc to be generated, we move a distance $dI$ to the left. Following convention, this is the negative direction, and therefore $dI = -dI_a$. Then solving equation 7 for $dK_a$ $$dK_a = -(I_a/K_o)(-dI_a) = (I_a/K_o)(dI_a)$$

This brings us to point $P_a$ on the curve. Again we move a distance $dI = -dI_b$ to the left, and solving for $dk_b$ $$dk_b = -(I_b/K_a)(-dI_b) = (I_b/K_a)(dI_b)$$

It will be seen that $I_a = I_o - dI$, $I_b = I_a - dI$, $I_c = I_b - dI$ and so on.

Also, $K_a = K_o + dK_a$, $K_b = K_a + dK_b$, $K_c = K_b + dK_c$ and so on. Thus, to carry out the step-by-step integration of equation 7, we move an increment $dI$, calculate the new value of $I$, calculate the value of $dK$ at that point on the arc, and then calculate the new value of $K$, whereupon we are ready to repeat the process to find the next point on the curve.

In order to carry out the above described step-by-step integration by use of a numerical control system, it is necessary to generate both a quotient, $(I/K)$, and a product, $(I/K)(dI)$. This is done in presently known numerical control systems which are either pulse rate multipliers or a digital differential analyzer along with cross coupled pre-settable counter/registers. Some modifications of the above-described step-by-step method, however, obviate the generation of the quotient and product, and greatly simplify the control system required to generate the desired curve.

As stated earlier, for all points on the true arc, $dr = 0$. When performing a step-by-step integration, however, $r$ cannot be maintained an exact constant and therefore, generally $dr$ will be non-zero. The larger $dr$ becomes, the farther we are from the true curve we are attempting to generate. Therefore, $dr$ may be thought of as an error indicator. The smaller we maintain $dr$, the more accurately we generate the curve.

The circuitry that would be required to generate $dr$ throughout the step-by-step integration could be quite complex. Fortunately, because we do not need to know the actual value of $dr$, but only need to minimize $dr$, another means is available. This results from the fact that $dr$ is very small compared to $r$. Therefore, we may treat $r$ as being composed of two parts, a constant part, $r_o$, and a variable part, $dr$. Thus, we can write $$r = r_o \pm dr \quad (8)$$

The product $rdr$ may then be written as $$rdr = (r_o \pm dr)\,dr = r_o dr \pm (dr)^2$$

The term $(dr)^2$ may be neglected in this equation and we may write $$rdr = r_o dr \quad (9)$$

Thus, it will be seen that $rdr$ is substantially directly proportional to $dr$ for all values we will be considering (i.e. where $dr << r$) and therefore, minimizing $dr$ will also minimize $rdr$. Therefore, $rdr$ may be used as an indicator of what to do to minimize $dr$. The use of $rdr$ as an error quantity to be minimized enables the carrying out of the step-by-step integration by use of equation 5 as will now be described.

Figure 4:
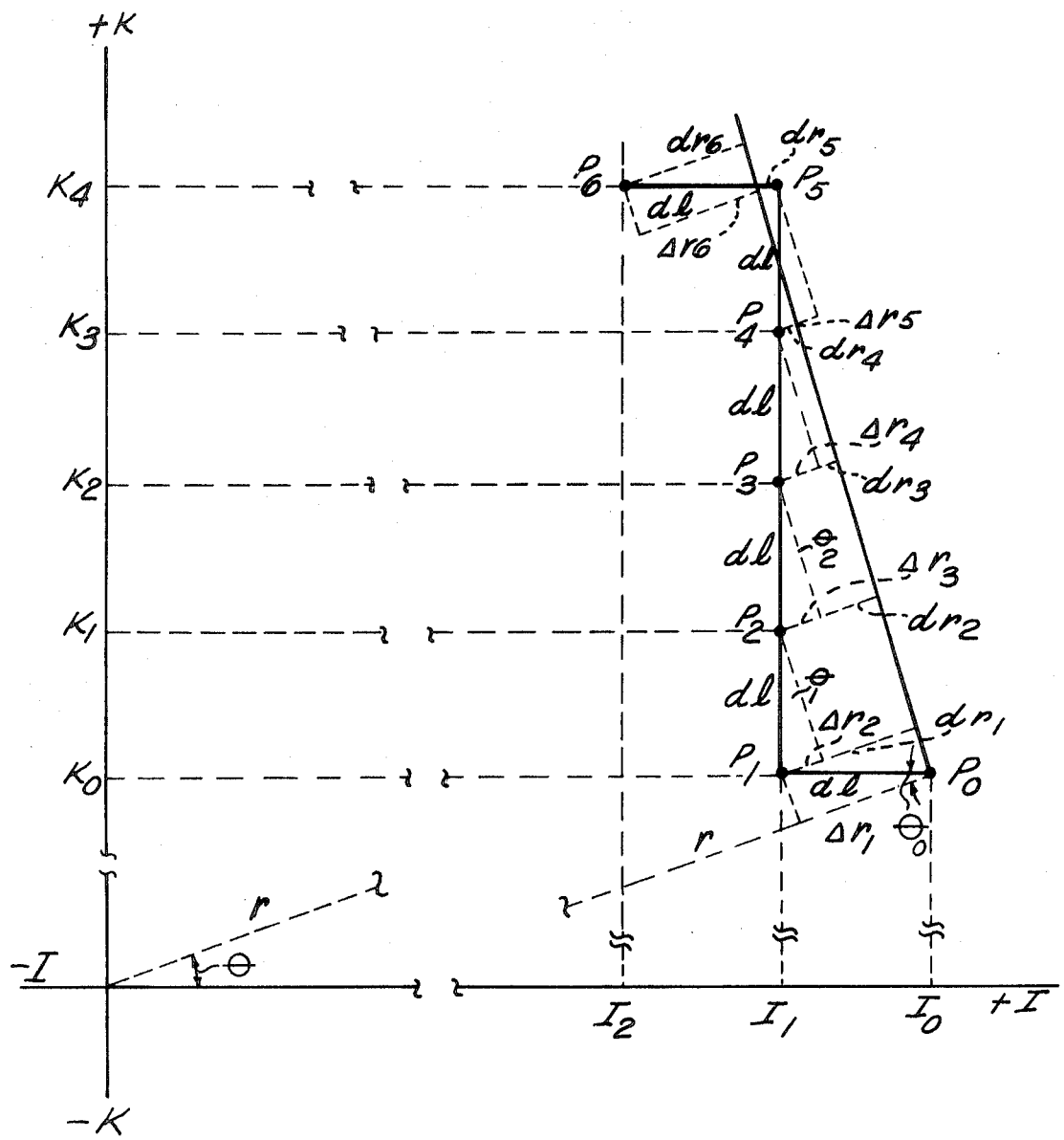
FIG. 4 is a greatly enlarged geometric illustration of a portion of a circle arc illustrating how that circle arc may be generated step-by-step.

Starting at a point $P_0$ as shown in FIG. 4 we may move an increment $dI = dl$ in the I-axis direction. Since $I = I_o$ and $K = K_o$ at point $P_o$, which is assumed to be on the true curve, we are now at a point $P_1$, where $I = I_1 = I_o - dl$ and $K = K_o$. From equation 7 it can be seen that we must move a distance $$dK = -(I_1/K_o)(-dl)$$

in the K-axis direction to get back on the true curve. Because of the physical limitations of the machine, however, we can move only integral multiples of $d$ in the K-axis direction. Therefore, unless $(I_1/K_o)$ is an integer, we must either stop short of the true curve or go beyond it. It is desirable, of course to stop as near to the true curve as possible. This could be accomplished by monitoring the value of $rdr$, which, as noted above, may be used as an indicator of how well $dr$ is being minimized. Such monitoring and comparing circuitry could become quite complex, and may be obviated by accepting a very slight increase in the average value of $dr$. That is, rather than concern ourselves with precisely minimizing $dr$, we will take whatever action is necessary to drive $rdr$ toward zero at each step of the integration. To do this, we need only determine the sign of $dr$, or as we have said, $rdr$.

Referring again to FIG. 4, let us define $dr$ as positive when the point in consideration lies on the outside of the true arc and negative when inside of the true arc. Thus, at point $P_1$, $dr$ is negative and we may write $dr = dr_1$ where the subscript 1 indicates the value of $dr$ at point $P_1$.

The error $dr_1$ was created by moving the distance $-dl$ in the I-axis direction. It can be shown that $$r_1 = (-dl)\cos\theta_o \qquad (10)$$

where $\theta_o$ is the angle between the direction of motion $dl$ in the I-axis and the radius $r$ at point $P_o$ along which $dr$ is directed. Furthermore, it can be shown that the radius $r$ passing through point $P_o$ makes the same angle $\theta_o$ with the I-axis, and therefore $$\cos\theta_o = I_1/r$$

Substituting this expression for $\cos\theta_o$ into equation 10 we get $$r_1 = (-dl)\, I_1/r$$

The value of $dr$ at point $P_1$ may be found by adding $\alpha r_1$ to the value of $dr$ at $P_o$, or $$dr_1 = dr_o + \Delta r_1 \qquad (11)$$

Since $dr_o = 0$ and we have just solved for $\Delta r_1$, we can write $$dr_1 = 0 + (-dl)\, I_1/r$$

Now, both $I_1$ and $r$ are positive. Therefore, for the example of FIG. 4, $$dr_1 = -(I_1/r)\,(dl)$$

We are limited in movement to incremented steps along the I-axis or K-axis. In order to get back on the true curve, or as nearly so as our system will permit, we must either move in the $+I$ direction or the $+K$ direction. Because we have just moved in the $-I$ direction to go from point $P_o$ to point $P_1$, we would undo what we have just done to return to $P_o$. Therefore, we will move in the $+K$ direction. The question then becomes, how far to move in the $+K$ direction. To answer this, let us first move one control increment $dl$ in the $+K$ direction.

Moving $dl$ in the $+K$ direction from point $P_1$ brings us to point $P_2$. In so doing, we change the value of $K$ from $K_o$ to $K_1$ and generate a change in the radius $\Delta r_2$. It can be shown that $$\Delta r_2 = (dl)\sin\theta_1$$

where $\theta_1$ is the angle between the radius $r$ passing through point $P_2$ and the I-axis. $\sin\theta_1$ may also be expressed as $$\sin\theta_1 = K_1/r$$

and substituting this expression for $\sin\theta_1$ into the above equation we get $$\Delta r_2 = (dl)\,(K_1/r) \qquad (13)$$

Thus, by letting $dr_2$ represent the value of $dr$ at point $P_2$, we may write $$dr_2 = dr_1 + \Delta r_2 \qquad (14)$$

Now, if you substitute into equation 14 the values of $dr_1$ and $\Delta r_2$ as given in equations 12 and 13 we get $$dr_2 = -(I_1/r)\,(dl) + (K_1/r)\,(dl)$$

Further steps along the K-axis, each step being $dl$ in length, will bring us to points $P_3$, $P_4$, and $P_5$ in succession. At point $P_4$, $dr$ may be expressed as $$dr_4 = dr_o + \Delta r_1 + \Delta r_2 + \Delta r_3 + \Delta r_4$$

and at point $P_5$, $dr$ may be expressed as $$dr_5 = dr_o + \Delta r_1 + \Delta r_2 + \Delta r_3 + \Delta r_4 + \Delta r_5$$

It will be seen that we cross the true curve between point $P_4$ and point $P_5$ and that as we do so the sign of $dr$ changes from negative to positive.

From point $P_5$, it is once again necessary to move in the -I-axis direction to get back on the true curve. Therefore, once more we move a control increment $dl$ in the -I-axis direction to bring us to point $P_6$. In going from point $P_5$ to $P_6$, we cross the true curve again and the sign of $dr$ changes from positive to negative.

From the foregoing, it can be seen that decrementing $I$ when $dr$ is positive generates a negative $\Delta r$; and that when $dr$ is negative, incrementing $K$ generates a positive $\Delta r$. We can identify the $\Delta r$ that results from decrementing $I$ as $\Delta r_i$ and the $\Delta r$ that results from incrementing $K$ as $\Delta r_k$ and write

[15]
$$dr_{(m+n)} = \sum_{i=1}^{n} r_i + \sum_{k=1}^{m} r_k$$

But $\Delta r_i = -(I_i/r)\,dl$
and $\Delta r_k = (K_k/r)\,dl$
Therefore

[16]
$$dr_{(m+n)} = \sum_{i=1}^{n} -\left(\frac{I_i}{r_o}\right) dl + \sum_{k=1}^{m} \left(\frac{K_k}{r_o}\right) dl$$

And because $r_o$ = constant, we may write

[17]
$$r_o\, dr_{(m+n)} = -\sum_{i=1}^{n} I_i\, dl + \sum_{k=1}^{m} K_k\, dl$$

Now, if we let $dl$ represent the unit length in our measuring system, we may replace $dl$ with the digit 1 and write

[18]
$$r_o\, dr_{(m+n)} = -\sum_{i=1}^{n} I_i + \sum_{k=1}^{m} K_k$$

Thus, equation 18 shows that $r_o dr$ may be generated by the summation of $I_i$ and $K_k$. This can easily be carried out be a numerical control system, and, as noted earlier, can be accomplished without directly generating a quotient or a product.

Another feature of the present invention is that it provides that the maximum deviation from the true curve of each linear displacement commanded by the coarse interpolator may be limited to any distance desired. When a circle arc is the true curve, the series of linear displacements commanded by the coarse interpolator will describe chords of segments of the arc. Maximum deviation occurs at the midpoints of the chords. Thus, the shorter the radius of curvature of the arc, the shorter the arc segments must be to maintain a given maximum deviation. Conversely, the longer the radius of curvature of the arc, the longer the arc segments may be made without exceeding the given maximum deviation. Stated another way, the greater the curvature of the arc, the closer spaced must be the data points in order to approximate the true curve within the accuracy desired; i.e. without exceeding the given maximum deviation allowable. Also, it should be noted that spacing between data points must be measured along the arc, and not in just one of the coordinate axes.

Figure 5:
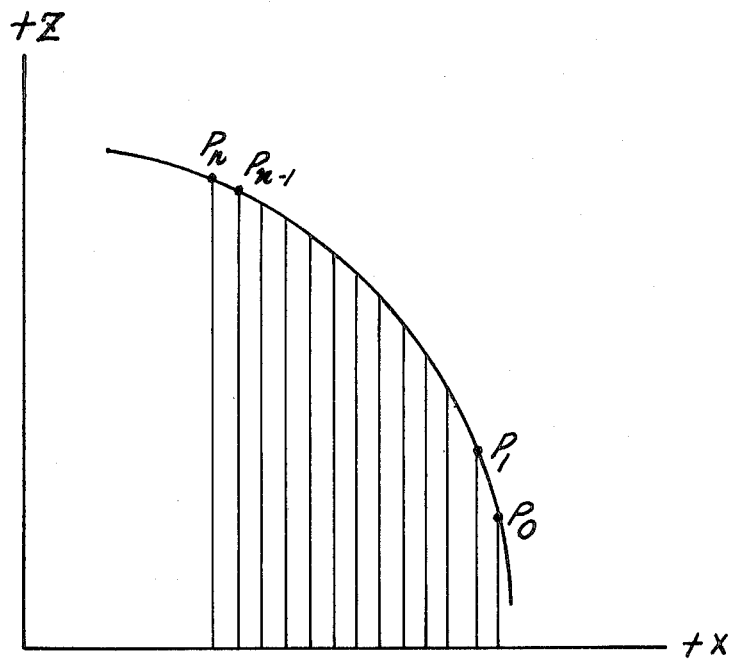
FIG. 5 is an illustration of a circle arc showing how chord length varies with constant increments in one axis.

For example, if data points are equally spaced along the X-axis at intervals of $\Delta x$, as shown in FIG. 5, then the arc distance from $P_o$ to $P_1$ will be much greater than $\Delta x$ while the distance from $P_{n-1}$ to $P_n$ will be nearly equal to $\Delta x$. Thus, if the interval at $P_o$ is sufficient for the desired accuracy, more data points are used near $P_n$ than need be. Conversely, if the interval at $P_n$ is needed for the required accuracy, then there are insufficient data points near $P_o$ to give the required accuracy.

The solution, of course, is to provide for equal data intervals along the arc, or in other words, constant chord length between data points. Again, as with the above discussed method of arc generation, the problem is to provide the solution in a form that may readily be carried out by a numerical control system.

Figure 6:
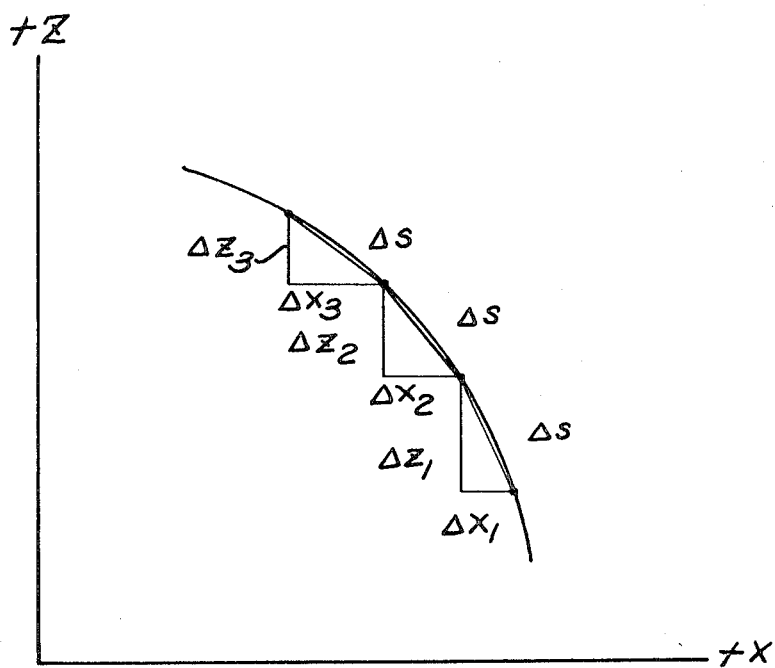
FIG. 6 is a geometric illustration of a portion of a circle arc showing how the relative displacements in two coordinates axes vary with constant chord length.

Referring to FIG. 6, there is shown a circle arc having three chords $\Delta s$ of equal length. The corresponding incremental displacements $\Delta x$ and $\Delta z$, however, differ for each chord $\Delta s$. However, $\Delta x$ and $\Delta z$, rather than $\Delta s$, are the parameters that are readily available in the numerical control system.

In order to generate an indication of $\Delta s$ from $\Delta x$ and $\Delta z$, we employ two mathematical relationships. The first of these is the well known Pythagorean theorem, which stated in terms of the variables $\Delta x$, $\Delta z$, and $\Delta s$ yields $$(\Delta s)^2 = (\Delta x)^2 + (\Delta z)^2 \qquad (19)$$

The other mathematical relationship may be stated as $$p^2 = \sum_{i=1}^{p}(2i-1) \qquad (20)$$

It will be seen that this relationship permits us to generate the square of a number by summation, a process, which as noted above, can easily be carried out by a numerical control system. The derivation of the actual process is as follows:

In generating the desired circle arc according to equation 18, $I$ and $K$ are selectively decremented or incremented, as the case may be. From an initial point $P_o$, where $x = x_o$, $z = z_o$, the coordinates of the generating point will be at any time $x = x_o - ndl$ and $z = z_o + mdl$, where $n$ is the number of times we have decremented $I$ and $m$ is the number of times we have incremented $K$. Again, letting $dl$ be the unit length of our system, we can set $dl$ equal to unity and write $x = x_o - n$ and $z = z_o + m$. Therefore, since $x = x_o - \Delta x$ and $z = z_o + \Delta z$, it is apparent that $\Delta x = n$, and $\Delta z = n$, and it follows that $$(\Delta s)^2 = n^2 + m^2 \qquad (21)$$

and therefore $$(\Delta s)^2 = \sum_{i=1}^{n}(2i-1) + \sum_{k=1}^{m}(2k-1) \qquad (22)$$

Therefore, to generate chords of constant length, we merely calculate $(\Delta s)^2$ and then solve equation 22 step-by-step as $n$ and $m$ are incremented. This provides the desired accuracy with the fewest data points, or arc segments. Rather than calculate a different $(\Delta s)^2$ for each arc to be generated, although this could be done, the apparatus of the present invention uses for simplicity three discreet values of $(\Delta s)^2$, each covering a range of arc curvatures. The particular value of $(\Delta s)^2$ is used that will provide the desired accuracy, or as stated earlier, prevent the deviation from the true curve of the commanded linear displacement from exceeding the maximum given deviation allowable.

It should be noted that the foregoing discussion of the mathematical relationships between the several variables that only counter clockwise arc generation in the first quadrant has been illustrated. It will be apparent to persons skilled in the art that by suitable sign changes arc generation may be accomplished in any quadrant in either the clockwise or counter-clockwise direction. Also, as will be explained subsequently, straight line generation (linear interpolation) may be carried out by the same apparatus that carries out circle arc generation (circular interpolation).

Figure 7:
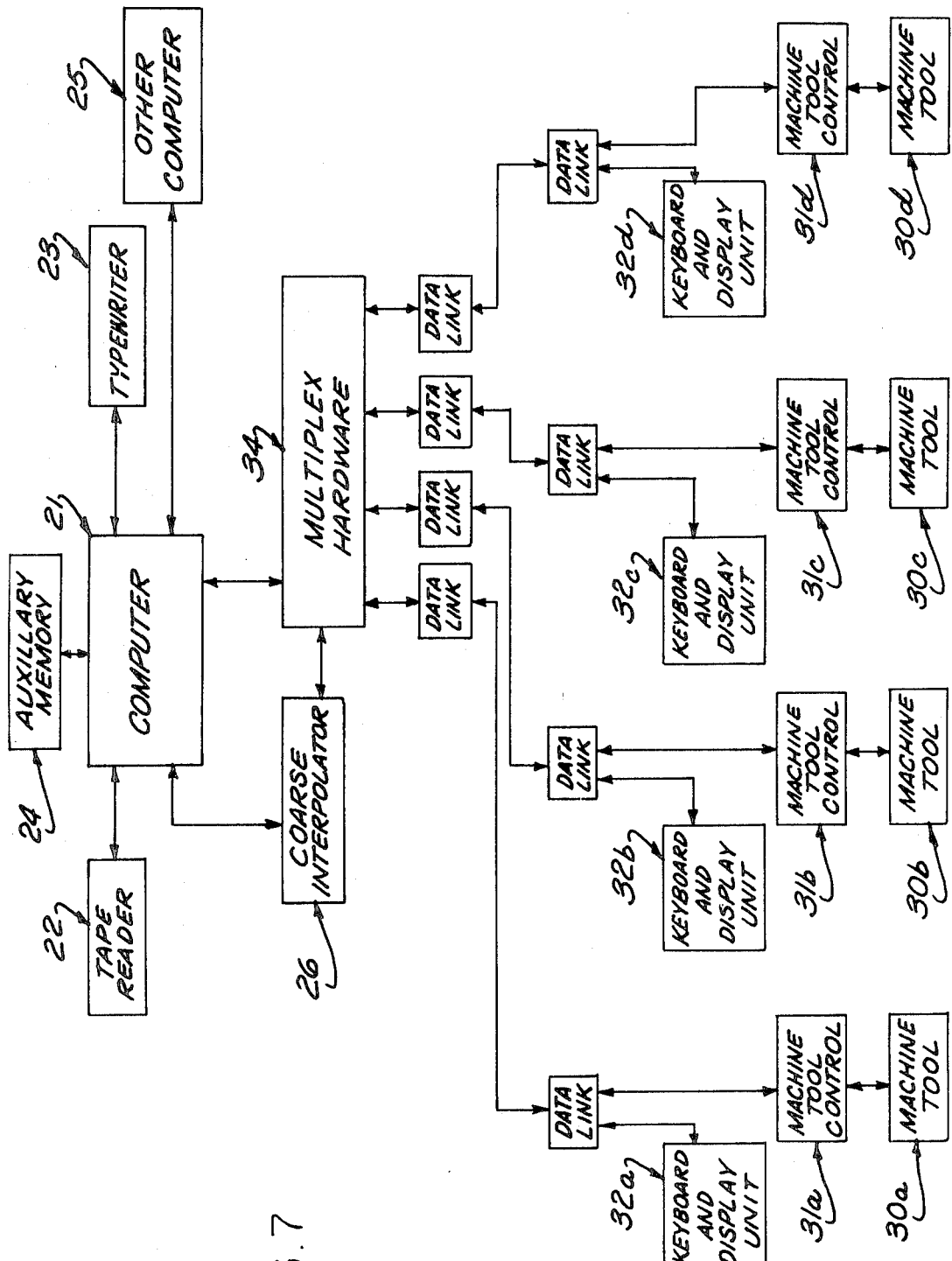
FIG. 7 is a schematic block diagram illustrating the machine tool control system of the present invention.

Referring now to FIG. 7, there is shown a block diagram of a machine tool control system for controlling a plurality of machine tools. The present system has been designed primarily for the control of two-axis and four-axis turret lathes. However, the system is adaptable for use with milling machines, drilling machines, punch presses, positioning tables, and other machine tools. In fact, different kinds of machine tools may be simultaneously controlled by the same system.

The control system comprises a digital computer 21 and its related input/output devices, such as a tape reader 22 and a typewriter 23. The digital computer 21 is provided with auxiliary memory 24 which may be of the rotating disc or drum type, and optionally may be linked with another computer 25. Control signals to each of the machine tools are provided by the computer software and a coarse interpolator 26 from part programs describing the various parts to be machined.

Each machine tool 30 is provided with a machine tool control 31 and may optionally be provided with a keyboard and display unit 32. The keyboard and display unit 32 at the machine tool provides substantially the same functions as the typewriter 23 at the computer, but may be restricted by the computer software from calling up certain part programs currently in use on other machine tools. Multiplex hardware 34 coupled to the coarse interpolator 26 and the computer 21 cooperates with the computer software to control the flow of data between the computer central processor unit, the coarse interpolator 26, and the several machine tools 30. Communication between the multiplex hardware 34 and each machine tool control 31 and keyboard and display unit 32 is provided by a data link that time multiplexes the flow of data according to a predetermined priority.

The computer software is written to accept part programs in either the EIA or ASCII standard punched paper tape formats. The part programs are modified by the software and stored in the auxiliary memory 24. Any part program usable on a given machine tool 30 may be activated by typing the proper part program code on the keyboard associated with that machine tool. Typing the proper code at the keyboard causes the desired part program to be read from auxiliary memory 24 into an area of core in the computer 21 set aside for the associated machine tool. From core the software makes the part program available on a block by block basis to the machine tool control 30 and the coarse interpolator 26. Each block of the part program may contain a number of coded commands for the machine tool, for example, feedrate number, spindle speed, turret face and tool offset, etc. as well as the contouring or positioning information. The contouring information comprises a preparatory code identifying the contouring motion (dwell, linear, clockwise arc, counterclockwise arc), the displacements for the two axes involved and, if the motion is circular, the arc center offset dimensions for each axis. In the present system, contouring information is made available to the coarse interpolator 26 and all other information is made available directly to the machine tool control 31 and its associated display 32. For a fuller understanding of how this is accomplished, reference is now made to FIG. 8.

Figure 8:
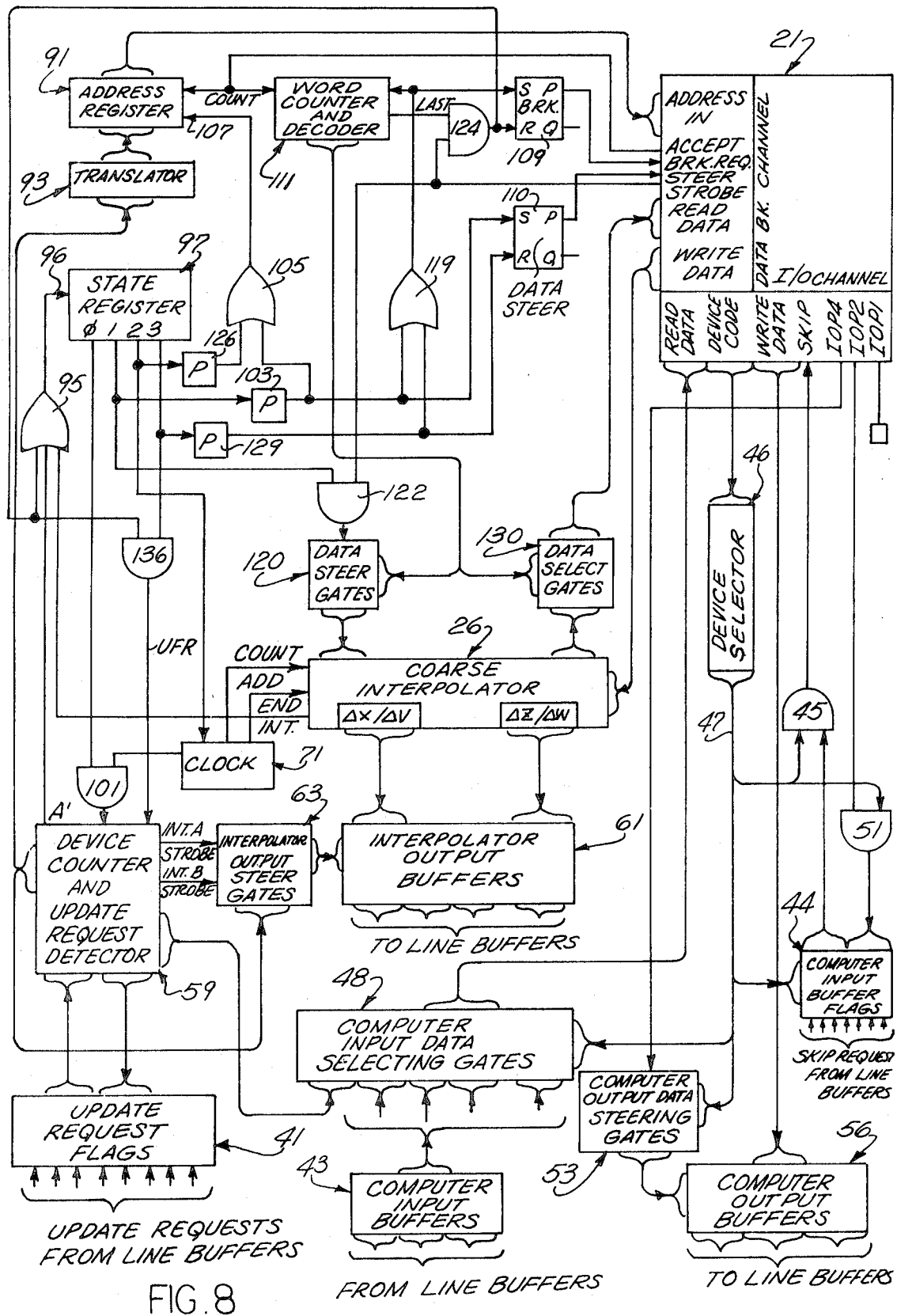
FIG. 8 is a schematic block diagram showing in greater detail the computer, multiplex hardware, and coarse interpolator of the present invention.

FIG. 8 shows in block diagram form the computer 21, a number of components comprising the multiplex hardware 34, and the coarse interpolator 26. The presently preferred digital computer is a model PDP/8 digital computer manufactured by the Digital Equipment Corporation. Other computers, of course, could also be used. The computer has two channels for inputting and outputting data. The first of these is the low speed channel referred to hereinafter as the I/O channel. The I/O channel is provided with terminals to read and write twelve bits in parallel, generate a six-bit device code in parallel, accept a one-bit skip request, and serially generate three input/output pulses (IOP1, IOP2, IOP4), each available at a separate terminal. The high speed data channel, sometimes called the data break channel, is provided with terminals to read and write twelve bits of data in parallel, accept a 12-bit address in parallel, accept a one-bit break request, accept a one-bit steering signal, output a one-bit accept pulse, and output a one-bit strobe pulse. Generally speaking, the differences between these two data channels are that the I/O channel is under software control and a skip request will be acknowledged only when the software is in a flag loop checking input and output device, but the data break channel is primarily under the control of outside equipment and a break request instantly stops the clock pulses to the central processor leaving it, as it were, in a state of suspended animation until the break is completed. In the present system, contouring information is handled through the data break channel while all other information is handled through the I/O channel.

Data flowing from the several machine tool controls 31 and keyboards 32 to the central control is of two different types; contouring information update requests and data for the central processor. Through the data link, an update request operates to set a flip-flop circuit 41, sometimes referred to as an update request flag. An update request flag 41 is provided for each axis pair of each machine tool 30 in the system. Data for the central processor is routed through the data link to a computer input buffer register 43. Each time data is loaded into a computer input buffer register 43 a corresponding flip-flop circuit 44 is set. These flip-flops are called computer input buffer flags. One eight-bit register and one flag comprise the computer input buffer for each machine tool in the system.

All of the set outputs of the computer input buffer flags are connected to the skip request input of the I/O channel through AND gates 45. Thus, a skip request is initiated whenever any of the computer input buffer flags 44 is set and its associated AND gate is enabled. The software periodically executes a routine that sequentially generates six-bit device codes. These device codes are decoded by a device selector circuit 46. In this circuit, the six-bit device code is decoded to provide separate output lines 47 for each device. Each of the output lines 47 is connected to the AND gate 45 that is associated with the computer input buffer flag of its corresponding device to enable that AND gate when the device code corresponds to that computer input buffer. Thus, when the software generates the device code corresponding to a buffer with its flag set, a skip signal results.

The output lines 47 of the device selector circuit 46 are also connected to computer input data selecting gates 48 and function to connect each computer input buffer register to the I/O channel read inputs so long as the corresponding device code is being output by the computer. That is, as the software routine sequentially generates device codes, the corresponding computer input buffers are connected to the I/O channel read terminals.

No data is read, however, until a skip signal is present. A skip signal causes the data to be read into the computer which then generates an input/output pulse IOP2. Pulse IOP2 is gated by the output lines 47 of the device selector circuit through AND gates 51 to reset the flag of the computer input buffer that has just been read.

The flow of data from the central processor to the several machine tool controls 31 and displays 32 through the I/O channel is very similar to the inward flow of data just described. The output lines 47 of the device selector circuit are also connected to computer output data steering gates 53 as well as to the computer input data selecting gates 48. The computer output data steering gates 53 comprise a plurality of two-input AND gates, each having one input connected to one of the device selector circuit output lines 47, and the other input connected to the input/output pulse line IOP4. The computer output data steering gates 53 steer pulse IOP4 to the proper strobe input of one of a plurality of computer output buffers 56. The computer output buffers 56 are substantially the same as the computer input buffers, there being an eight-bit register and flag for each machine tool in the system. The steering inputs of all the registers are connected to the write data terminals of the I/O channel but, no register is set until it is strobed by IOP4. The computer output buffers 56 are also arranged so that IOP4 sets the flag of the selected buffer.

The other type of data flowing from the machine tool controls 31 to the central control, as mentioned above, is the update request for contouring data. There is one update request flag 41 for each machine tool axis pair in the system. When a machine tool control 31 calls for additional contouring information, it sends an update request code to the central control via the data link, which sets the corresponding update request flag 41. Update request flags 41 are detected by a device counter and update request detector 59 that in turn causes a data break to be initiated. On the data break, contouring information is read from computer core into the coarse interpolator 26. The coarse interpolator generates the update information. The device counter circuits then steer the update information to an interpolator output buffer 61 via interpolator output steering gates 63 for subsequent transmission to the requesting machine tool control.

All functions of the system not controlled by the computer clock are controlled by an interpolator clock 71. Therefore, the interpolator clock 71 will now briefly be described to provide a fuller understanding of the interpolator functions to be described below. With reference to FIG. 9, the interpolator clock 71 comprises an oscillator and wave shaping circuits 72 that produce a 10 megacycle square wave identified by the letter F. The square wave F drives the input of a four-stage counter 73 having its stages connected to produce a 1-2-4-5 binary coded decimal code. These counter outputs and the signals present at them are labeled C1, C2, C3, and C4. The signals are shown graphically in FIG. 10B.

Output C4 is a symmetrical 1 megacycle square wave and it drives the input of a second counter 74 connected identically to the first to produce signals B1, B2, B3, and B4 at the outputs similarly identified. These signals are shown graphically in FIG. 10C. Inverter amplifiers 75 are used to provide the complements $\overline{B1}$, $\overline{B2}$, and $\overline{B4}$. The B4 output drives a third four-stage counter 76 that differs from the first two in that it provides a 1-2-4-8 binary coded decimal code. The signals and outputs of the four stages of this counter are labeled A1, A2, A3, and A4. The signals are shown graphically in FIG. 10D. Inverting amplifiers 75 provide the complements $\overline{A1}$, $\overline{A2}$, $\overline{A3}$, and $\overline{A4}$ of each of these signals.

There is also shown in FIG. 9 a Gray code generator 77 having one input identified as the clock input. Its other input, labeled SR2, will be described subsequently.

The clock input may be connected to F, C1, C2, C3 or C4, depending upon how fast it is desired to operate the coarse interpolator 26. It will be assumed hereinafter that the clock input of the Gray code generator 77 is connected to F. The Gray code generator produces outputs CA, $\overline{CA}$, CB, and $\overline{CB}$. These outputs are connected to two AND gates 78 and 79 as shown in FIG. 9 to produce a count clock signal and an add clock signal. The wave forms CA, CB, count clock, and add clock are shown in FIG. 10A along with the signal F. The other clock outputs shown in FIG. 9 are used by the data links and multiplex hardware and will be described subsequently.

Figure 11:
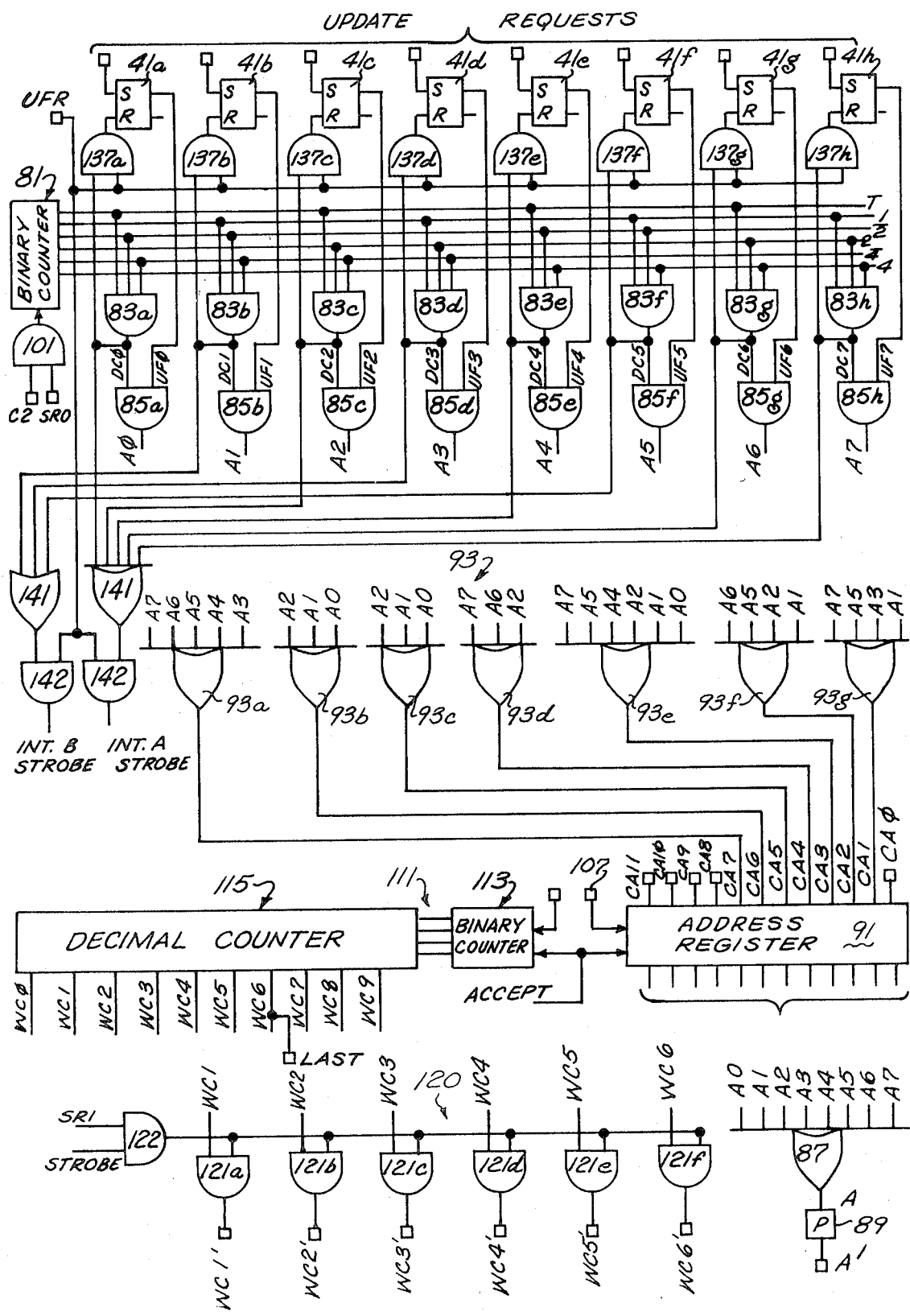
FIG. 11 is a schematic logic diagram showing the up-date request flags, the device counter and up-date request detector, the translator, the address register, the word counter and the data-steering gates.

Returning now to the update request sequence, the update request flags 41 and the device counter and update request detector 59 are shown in greater detail in FIG. 11. Eight update request flags are illustrated and are identified as 41a–41h. The update requests from the machine tool controls via the data links trigger the set inputs of the update request flags 41. The set outputs of the update request flags are labeled UF0–UF7. A binary counter 81 is driven by clock signal C2 to provide outputs 1, $\overline{1}$, 2, $\overline{2}$, 4, and $\overline{4}$. These outputs are the device count and are decoded by AND gates 83 to provide an output signal on a separate line for each binary count. These output signals are referred to as the device count signals and are labeled DC0–DC7. Each device count signal is anded with its corresponding update flag signal in AND gates 85 to produce update request detect signals A0–A7. All of the update request detect signals are ored together in OR gate 87 to produce a composite update request detect signal labeled A. The signal A provides the input to a pulse forming circuit 89 that is triggered by the leading edge of the signal A to produce a pulse output A'.

Referring again to FIG. 8, an address register 91 is shown connected to the device counter and update request detector 59 through a translator 93. The function of the address register 91 is to generate the proper 12-bit core address for reading contouring information out of the computer and into the coarse interpolator, and subsequently, reading contouring information out of the coarse interpolator back into computer core. Each axis pair in the system is allocated a certain area of computer core memory having a predetermined starting address. The computer software maintains the data in that area of memory current as will be described subsequently. The function of the translator 93 is to generate from the device count signals the starting addresses of the areas in core allocated to the machine tools and axis pairs for which an update is requested. The translator 93 and address register 91 are shown in greater detail in FIG. 11.

The update request detect signals, A0–A7 are connected to a plurality of OR gates 93a–93g which comprise the translator. The outputs of the OR gates 93a–93 are identified as CA1–CA7 which provide seven of 12 computer address signals, CA0–CA11. These are connected to the steering inputs of the address register 91 which comprises a twelve stage presettable binary counter. The computer core area for each axis pair is shown in Table I. The addresses are shown in octal arithmetic with the initial address of each area also shown in binary arithmetic. The binary digits correspond to the computer address signals CA0–CA11. Six core addresses are set aside for each axis pair. For example, the core address area for axis pair number one of machine member two corresponding to update request flag detect signal A2, occupies core addresses 0175-0202 octal in the computer core. Octal 0175 is the same as binary 000 001 111 101.

|    | (Octal)<br>Computer<br>Core Area | CA11<br>CA10<br>CA9 | CA8<br>CA7<br>CA6 | CA5<br>CA4<br>CA3 | CA2<br>CA1<br>CA0 |
|----|---------|-----|-----|-----|-----|
| A0 | 0161-0166 | 000 | 001 | 110 | 001 |
| A1 | 0167-0174 | 000 | 001 | 110 | 111 |
| A2 | 0175-0202 | 000 | 001 | 111 | 101 |
| A3 | 0203-0210 | 000 | 010 | 000 | 011 |
| A4 | 0211-0216 | 000 | 010 | 001 | 001 |
| A5 | 0217-0224 | 000 | 010 | 001 | 111 |
| A6 | 0225-0232 | 000 | 010 | 010 | 101 |
| A7 | 0233-0240 | 000 | 010 | 011 | 011 |

TABLE 1

Inspection of Table 1 shows that signals CA0 and CA8–CA11 happen to be the same for all the initial addresses used. This being the case, these digits do not need to be translated by the translator and therefore may be hard wired to the proper level. Thus, at the address register steering inputs, CA0 will be wired to the one level and CA8 through CA11 will be wired to the zero level. It will be recognized, of course, that had other core areas with other initial addresses been used, appropriate changes in the translator connections and the address register steering input connections would have to be made.

Referring again to FIG. 8, it will be seen that the A' output from the device counter and update request detector 59 is connected by way of an OR gate 95 to the count input 96 of a state register 97. The state register 97 comprises a two stage binary counter and decoding to provide a four output ring counter, the outputs being identified as SR0, SR1, SR2, and SR3. By means of an AND gate 101, SR0 enables the clock signals C2 to count the device counter 81. When the device counter 81 is counted to a count that corresponds to an axis pair requesting an update, an A' signal is produced. This counts the state register from state zero to state one causing SR0 to go from the logic 1 state to the logic 0 state and SR1 to go from the logic 0 state to the logic 1 state. Thus, the device counter 81 is stopped at the device count corresponding to the axis pair requesting an update. The device count signal produced by the corresponding AND gate 83 is translated by the translator 91 to the starting address of the computer core memory where the information for that axis pair is stored. SR1 is connected to a pulse generator 103 that triggers on the leading edge to generate a pulse signal SR1' that is connected through an OR gate 105 to the preset strobe input 107 of the address register 91. This causes the address register 91 to be preset to the computer core address of the first word of data that will be required to load the register of coarse interpolator 26. Pulse SR1' also triggers the set input of a break request flip-flop 109, the set output of which is connected to the break request terminal of the data break channel of the computer 21. Pulse SR1' also triggers the set input of a data steer flip-flop 111, the set output of which is connected to the steer terminal of the data break channel. A logic 1 signal on the steer terminal indicates that data is to flow into the computer while a logic 0 indicates that data is to flow out of the computer.

Immediately upon receipt of a break request, clock pulses to the central processor of the computer 21 are stopped and a data break is initiated. First, the computer makes an address check to determine whether the address appearing at the address terminals is an acceptable address. If the address is acceptable, an accept pulse is generated, the data at the addressed core location is made available at the write data terminals of the data break channel and a strobe pulse is generated. The accept pulse line is connected to the count input of the address register and acts to count the address register up one. This presents a new address to the data break channel which, if the break request is still present, will examine the new address and, finding it acceptable, generate an accept pulse, make the data from the addressed core location available at the write data terminals, and generate a strobe pulse. This sequence will continue so long as the break request is present and the addresses are found acceptable. In order to terminate the data break and to steer the data flowing out of the computer to the proper registers in the coarse interpolator, a word counter and decoder 111 is used.

Referring to FIG. 11, the word counter and decoder 111 comprises presettable binary counter 113 and decimal decoder 115. The decimal decoder 115 operates in much the same manner as the AND gates 83 of the device counter and update request detector 59 and is available as an integrated circuit package. The outputs of the decimal decoder identify the word count and are labeled WC0–WC9. The binary counter 113 is reset to zero by pulse SR1' via OR gate 119 and is counted by the accept pulse from the data break channel. It will be recalled that an accept pulse is generated before the stored data is made available at the write terminals and the strobe pulse is generated. Therefore, the word counter is counted from 0000 to 0001 before the proper data is available at the write terminals. Therefore, the WC0 output of the decimal decoder of the word counter and decoder is not used. Furthermore, as will be remembered with reference to Table 1, in the present example only six addresses per axis pair are used. This requires six word counts. So, as shown in FIG. 11, WC7, WC8, and WC9 are not used, but WC1 through WC6 are connected to data steering gates 120, comprising six AND gates 121, each having one input connected to one of the signals WC1 through WC6 and the other connected to the strobe pulse. An AND gate 122 prevents a strobe pulse from going to the data steering gates unless the state register is at state one and signal SR1 is one. The outputs of the data steering gates are labeled WC1'–WC6'. These outputs are connected to the preset strobe inputs of presettable registers in the coarse interpolator 26 as will be described subsequently. It should be here noted that different storage formats could be used. For example, if one of the six registers in the coarse interpolator required a longer word than 12 bits, then a seven-word format could be used wherein the first word would load the lower portion of a split register and the second word would load the upper portion of the split register.

Referring again to FIG. 8, there is an output from the word counter and decoder 115 labeled "last". This output is connected to the word count signal indicating the last word to be read out of computer core. In the present example, this is WC6 because the six-word per axis pair format has been used. Thus, when WC6 is at logic 1, it enables a two input AND gate 124, the second input of which is connected to the strobe pulse terminal of the data break channel. Therefore, AND gate 124 will pass the strobe pulse associated with the sixth word. The output of this AND gate 124 is connected to the reset terminal of the break request flip-flop 109 to remove the break request logic one when the sixth word has been transferred to the coarse interpolator 26. Upon termination of the break request, the central processor clock pulses are restored and the computer is free to go its own way.

The sixth word strobe pulse in addition to resetting the break request flip-flop 109 is also routed through OR gate 95 to step the state register 97 from state one to state two, causing SR1 to go from logic one to logic zero and SR2 to go from logic zero to logic one. SR2 is connected to a pulse generator circuit 126 that operates on the leading edge to generate a pulse SR2', SR2', like SR1', is connected to the preset strobe input 107 of the address register 91 through OR gate 105. The address register 91 will be preset to the same address as it had been set by SR1' because the counter 81, and therefore the translator 98, has not changed during state register state one. Signal SR2 also acts to enable the Gray code generator shown in FIG. 9. The Gray code outputs CA and CB are always both at the logic zero level when the Gray code generator is enabled and come to rest at the zero logic level when the enabling signal is removed. This assures that a count clock pulse will always be first and an add clock pulse will always be last.

Figure 12:
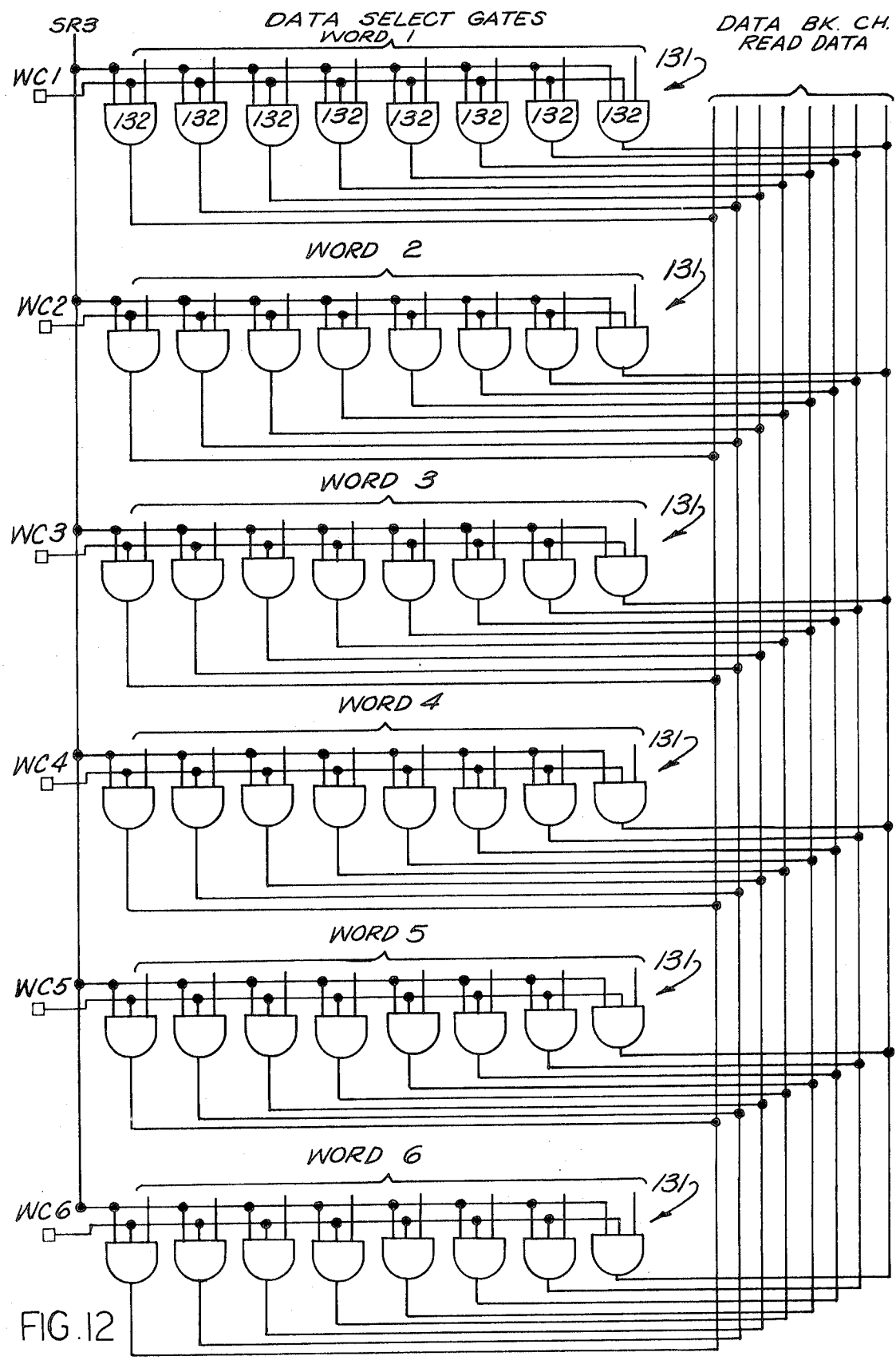
FIG. 12 is a schematic logic diagram of the data-select gates.

The coarse interpolator, operating on the count clock and add clock signals, generates a ΔX displacement and a ΔZ displacement or a ΔU displacement and a ΔW displacement, depending upon the axis pair requesting the update. X and Z designate the single axis pair of a two-axis machine tool and the first axis pair of a four-axis machine tool. U and W represent the second axis pair of a four-axis machine tool. In generating ΔX and ΔZ, for example, data that was transferred to the coarse interpolator registers from the computer is modified and at the end of an interpolation cycle, it is necessary to transfer this data back to the computer core. This process is initiated by an end interpolate signal, END INT., generated by the coarse interpolator. The END INT. signal is connected to the count input 96 of the state register 97 via OR gate 95 and acts to count the state register from state two to state three, causing SR2 to go from logic 1 to logic 0 and SR3 to go from logic 0 to logic 1. SR3 is connected to a pulse generating circuit 129 that operates on the leading edge to produce an output pulse SR3'. SR3' sets the break request flip-flop 109 via OR gate 119 and resets the steering flip-flop 111. Thus, a data break is initiated with the data steer signal at logic zero, indicating that data is to be read into core. Data is read into core from the coarse interpolator registers through data select gates 130 which are shown in more detail in FIG. 12. Each data select gate comprises an array 131 of three-input AND gates 132, all of which have one input connected to SR3. The second input of the gates of one array are connected to the associated word count signal. For example, the second inputs of all the AND gates 132 in the first array are connected to WC1. The second inputs of all of the AND gates in the second array are connected to WC2, and so on. The third input of each AND gate is connected to one stage of the coarse interpolator register associated with the array.

The outputs of these AND gates are connected to the data break read terminals. Thus, when SR3 is at logic 1 and WC1 is at logic 1, the first register of the coarse interpolator is connected through the first array of AND gates to the read gates of the data break channel.

It will be seen that data is read into core in much the same manner that is was read into the coarse interpolator. That is, when the data break is initiated, the computer checks the address at the data break address terminals and, finding it acceptable, sends out an accept pulse and a strobe pulse. Because the steer input is at logic 0, the strobe pulse is gated to the core register identified by the address in the address register. As before, the accept pulse advanced the word counter from 0000 to 0001 binary changing WC1 to the logic 1 level. Therefore, the data presented to the data break channel read terminals will correspond to the core address just accepted by the computer. When the last word, the sixth word in our example, is read into core, the strobe pulse is gated to the reset input of the data break flip-flop 109 thus ending the data break. This is the same as when data was read from the computer into the coarse interpolator. However, this time the data break reset pulse is enabled by SR3 to pass through an AND gate 136 to generate an update flag reset signal labeled UFR. The UFR signal is gated by the device counter and update request detector circuits 59 to reset the update request flag 41 corresponding to the axis pair for which contouring data has just been interpolated. This can be seen in more detail in FIG. 11 which shows a plurality of two input AND gates 137, each having an input connected to UFR. The other input of each AND gate 137 is connected to its corresponding device count signal, DC0 through DC7. The outputs of these AND gates 137 are connected to the reset inputs of their corresponding update request flags or flip-flops 41. Thus, because the binary counter 81 of the device counter and update request detector circuit 59 has been stopped since SR0 went from logic one to logic zero, the UFR signal will be gated to reset the detected flag and no others.

The VFR signal is used also to produce an interpolate A strobe signal, INT. A, and an interpolate B strobe signal, INT. B, by OR gates 141 and AND gates 142. These two strobe signals are used to strobe the displacement data generated by the coarse interpolator 26 from the coarse interpolator registers to the interpolator output buffers 61. Two strobe signals are needed because the system serves both two-axis and four-axis machine tools. For purposes of illustration, the device counter and update request detector is shown in FIG. 11 connected to serve three four-axis machine tools and two two-axis machine tools. Thus DC0 identifies the first axis pair of the first machine, DC1 identifies the second axis pair of the first machine, DC2 identifies the first axis pair of the second machine, DC3 identifies the second axis pair of the second machine, DC4 identifies the first axis pair of the third machine, DC5 identifies the second axis pair of the third machine, DC6 identifies the axis pair of the fourth machine, and DC7 identifies the axis pair of the fifth machine. The fourth and fifth machines, of course, are two-axis machine tools. Thus, the INT. A strobe signal will be produced if the axis pair for which data has been interpolated is the first axis pair of a four-axis machine or the axis pair of a two-axis machine. On the other hand, if the device for which data has just been interpolated is the second axis pair of a four-axis machine, INT. B strobe will be produced. A fuller description of the use of these strobe signals will be given subsequently in connection with a description of the data link.

Figure 13:
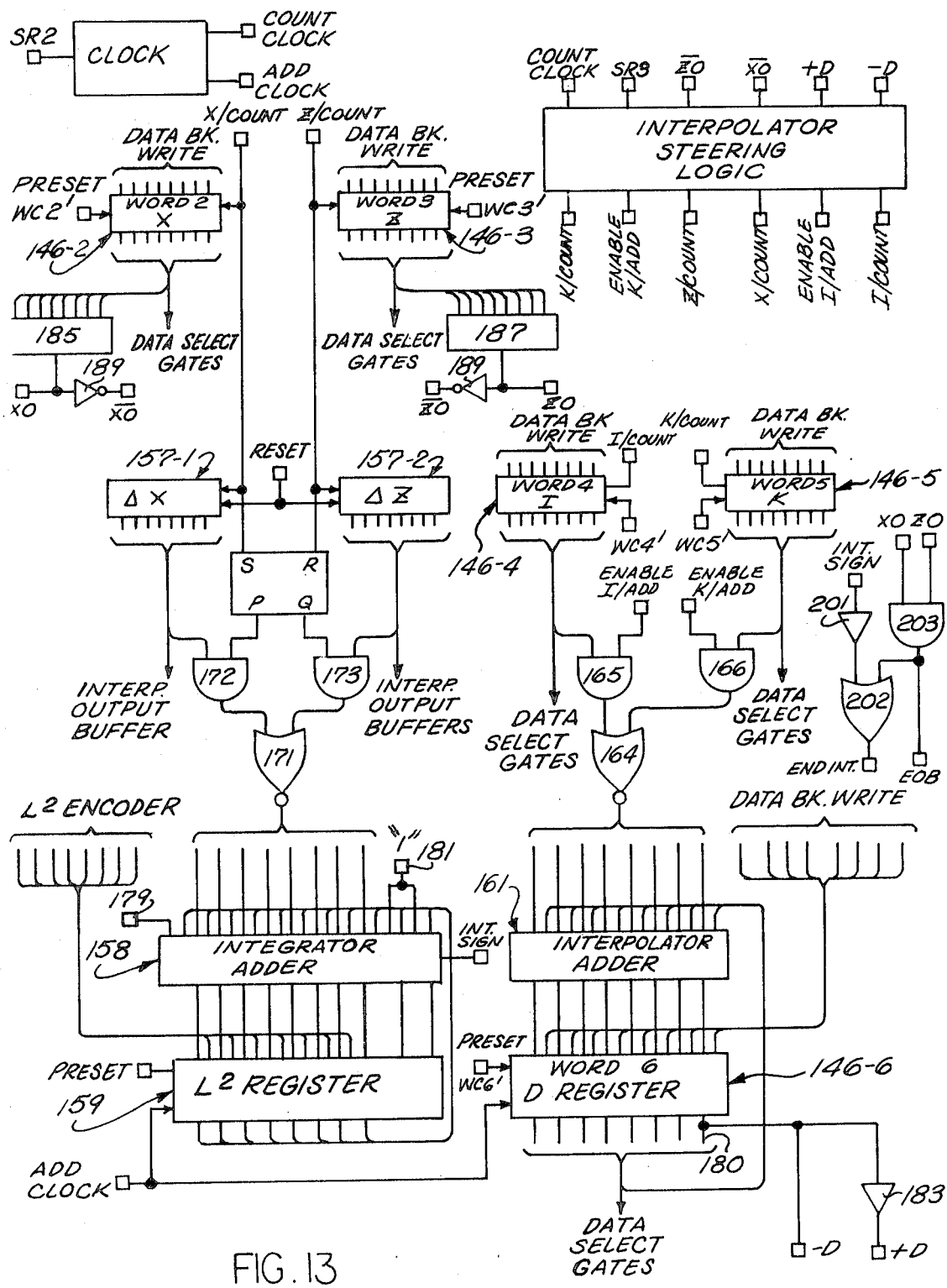
FIG. 13 is a schematic block diagram of the arithmetic portion of the coarse interpolator.
Figure 14:
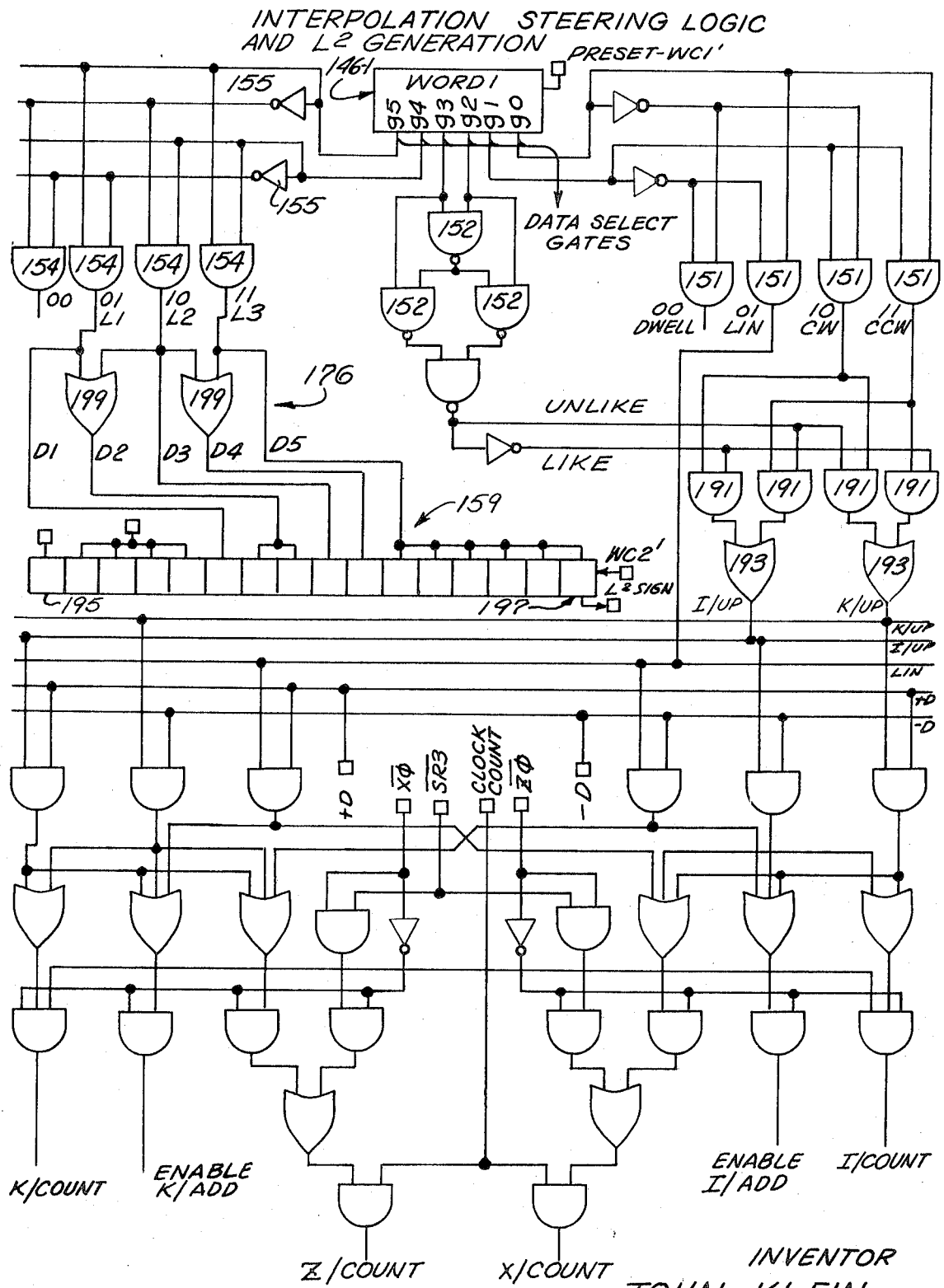
FIG. 14 is a schematic logic diagram of the steering logic portion of the coarse interpolator, the $L^2$ encoder, and the $L^2$ register.

FIGS. 13 and 14 show the coarse interpolator of the present invention schematically, the arithmetic portion being generally shown in FIG. 13 and the steering logic portion being generally shown in FIG. 14. As noted elsewhere, data is transferred from the computer via the data-break channel to the registers 146 of the coarse interpolator. This data, in the illustrative example, is in a six-word format and appears serially at the data break write terminals. Each of the registers in the coarse interpolator to be loaded with data from the computer has its steering inputs connected to the write terminals of the data break channel. The proper data is loaded into the proper coarse interpolator registers by the word count pulses, WC1' through WC6' which are, in effect, the data break strobe pulse steered by the word counter. In the presently preferred system, the first word of the six-word format is the preparatory function, generally referred to as the G-word or H-word in the numerical control art. This is because in standard punched paper tape format, the preparatory function is identified by either the letter G or the letter H followed by two numerals. On a four-axis machine, the letter G identifies the preparatory code for the side turret axis pair and the letter H identifies the preparatory function for the end turret axis pair. Although there are a number of preparatory functions, including dwell, threading with constant lead, threading with linearly increasing lead, etc., we are here concerned with only three functions. These are G01, G02, and G03, identifying respectively, linear interpolation, circular interpolation clockwise, and circular interpolation counterclockwise.

The second and third words define the X-axis and Z-axis displacements to be effected during execution of the interpolation. If the interpolation is to be circular, then the arc center offset dimensions in each axis are required. Thus, the fourth and fifth words are the arc center offset dimensions in the X-axis and Z-axis, respectively. If the interpolation is to be linear, the fourth and fifth words will be the Z-axis and X-axis displacements, the same as the third and second words, respectively. The sixth word of the six-word format is initialized to zero by the software and is provided for use by the coarse interpolator, as will be described below.

The preparatory function is considerably modified from the standard tape format by the softwear for use by the the coarse interpolator. For a full explanation of the present invention, only six bits of the preparatory function as loaded into the coarse interpolator, word 1 register 146-1 need be considered. The first two bits, $g0$ and $g1$, define the interpolating function as follows:

| $g0$ | $g1$ | Function |
|---|---|---|
| 0 | 1 | Linear Interpolation |
| 1 | 0 | Circular Interpolation Clockwise |
| 1 | 1 | Circular Interpolation Counterclockwise |

The third bit $g2$ is the sign of the X displacement and the fourth bit $g3$ is the sign of the Z displacement. The fifth and sixth bits $g4$ and $g5$ identify the chord length to be used by the coarse interpolator. The first and second bits are decoded by AND gates 151 to provide signals labeled LIN, CW, and CCW. The third and fourth bits are decoded by NAND gates 152 and an inverter 153 to provide a LIKE signal and an UNLKE signal. The fifth and sixth bits are decoded by AND gates 154 and inverters 155 to provide signals labeled L1, L2 and L3.

Referring again to FIG. 13, there is shown, in addition to the X, Z, I, K, and D registers, 146-2, 146-3, 146-4, 146-5, and 146-6, respectively, a $\Delta X$ register 157-1 a $\Delta Z$ register 157-2, an integrator adder 158, an $L^2$ register 159 and an interpolator adder 161. Each stage of the interpolator adder 161 has two inputs, one of which is connected to the corresponding stage of D register outputs. The other inputs of the interpolator adder are connected to either the I register 146-4 or the K register 146-5 by a plurality of OR gates 164 and AND gates 165 and 166. The D register 146-4 has two inputs per stage, a preset input and a set input. The preset inputs are connected to the data break write terminals and the set inputs are connected to the interpolator adder outputs. The D register outputs are also connected to the data select gates, described elsewhere.

The integrator adder 158 is substantially identical to the interpolator adder 161 and has one set of inputs connected to the outputs of the $L^2$ register 159 and the other set of inputs connected through a plurality of NOR gates 171 and AND gates 172 and 173 selectively to either the $\Delta X$ or $\Delta Z$ register. The $L^2$ register 159 is substantially the same as the D register 146-6 and has its preset steering inputs connected to an $L^2$ encoder 176 and its set inputs connected to the outputs of the integrator adder 158.

It should be noted, at this point, that the $\Delta X$ and $\Delta Z$ registers are not connected directly stage-by-stage to the integrator adder inputs, but are shifted one stage toward the most significant digit. This leaves the least significant digit input 179, or the $2^0$ bit, independent of the values of $\Delta X$ and $\Delta Z$. This input 179 is permanently wired to the logic 1 level. It will also be noted that the outputs of NOR gates 171 are inverted, thereby providing the 1's complement of either $\Delta X$ or $\Delta Z$. Also, the integrator adder has several more stages than either the $\Delta X$ or $\Delta Z$ registers. The first inputs of the more significant stages of the $\Delta X$ or $\Delta Z$ registers are permanently connected to logic 1 signals at 181. Thus, the number actually presented to the integrator adder by the AND gates 172 and 173 and OR gates 171 and the permanent wiring is either $2 \overline{\Delta X} + 1$ or $2 \overline{\Delta Z} + 1$. The carry output of the integrator adder provides a signal labeled INT SIGN, the use of which will be described later.

The most significant stage output 180 of the D register provides a signal identified as $-D$. An inverter 183 connected to output 180 provides its complement labeled $+D$. Two other signals shown on FIG. 13 are currently of interest. These are the XO and the ZO signals provided by zero detectors 185 and 187 connected to the X and Z registers respectively. Because 1's complement arithmetic is used in the coarse interpolator, these detectors are in fact 1's detectors rather than zero detectors. However, in any case, their function is to indicate when the X dimension or the Z dimension has been "used up". Inverters 189 provide the complements, $\overline{XO}$ and $\overline{ZO}$.

Referring again to FIG. 14, the LIKE, UNLIKE, CW, and CCW signals are logically combined by AND gates 191 and OR gates 193 to provide an I/UP and a K/UP signal. It can be shown mathematically that when the sums of X and Z are alike, e.g., both positive or both negative, the X axis arc center offset dimension, I, will continuously increase for clockwise arcs while the Z axis arc center offset dimension, K, continuously decreases. For counter-clockwise arcs, K increases while I decreases. When the signs of X and Z are unlike, e.g., one positive and one negative, K will increase for clockwise arcs while I decreases. For counter-clockwise arcs, I will increase while K decreases. This is the logic embodied in the generation of the I/UP signal and the K/UP signal. In order words, when the I/UP signal is at logic 1, it indicates that I is increasing while K is decreasing and when the K/UP signal is at logic 1, it indicates that K is increasing while I is decreasing.

The I/UP, K/UP, LIN, +D, −D, $\overline{XO}$ and $\overline{ZO}$ signals are logically combined with the $\overline{SR3}$ and count-clock signals to provide six outputs labeled K/COUNT, ENABLE K/ADD, Z/COUNT, I/COUNT, ENABLE I/ADD, and X/COUNT. These last mentioned signals provide the steering logic for the arithmetic portion of the course interpolator as will now be described.

In the preferred embodiment, all arithmetic operations in the coarse interpolator are carried out in binary arithmetic. The counter/registers count only up. Therefore, in order to effect a down/count, the 1's complement is loaded into a register rather than the true binary number. Complementing is effected by the computer softwear as a function of the signs of the X and Z displacements and whether interpolation is clockwise or counter-clockwise by logic analogous to that of the coarse interpolator steering logic. By way of illustrative example, it will be assumed that we wish to generate a clockwise arc, that the X displacement is to be +13, that the Z displacement is to be +23, that the arc center offset distance I is 21, and that the arc center offset distance K is 27. Under these conditions, I will be counted up and K will be counted down. Therefore, the true value of I will be loaded in the I register and the complement of K will be loaded in the K register. The 1's complements of X and Z are always loaded in the X and Z registers, respectively. The ΔX and ΔZ registers are reset to zero and the D register is initially loaded with the value zero from the computer. Thus, for the given values, the initial conditions in the registers 146 are shown in Table II.

The I/UP signal is at logic 1 as determined by the LIKE signs of X and Z and the preparatory function calling for clockwise interpolation. Therefore, whether I and K are incremented or whether K and Z are incremented is a function of the sign of the D register. The logic is such that the down function is always incremented first. Therefore, the first count-clock pulse will be a K/COUNT and an X/COUNT. The ENABLE/K signal gates the K register to the interpolator adder, the output of which will be settled down in time for the add-clock pulse. When the add-clock pulse comes, the interpolator adder output to be strobed into the D register 146-6 will be the sum of the existing D register value and the K register value. Because the initial value of D is zero, and the K register 146-5 has just been counted up one by the count clock, the new value in the D register will be the initial value in the K register plus one.

Figure 15:
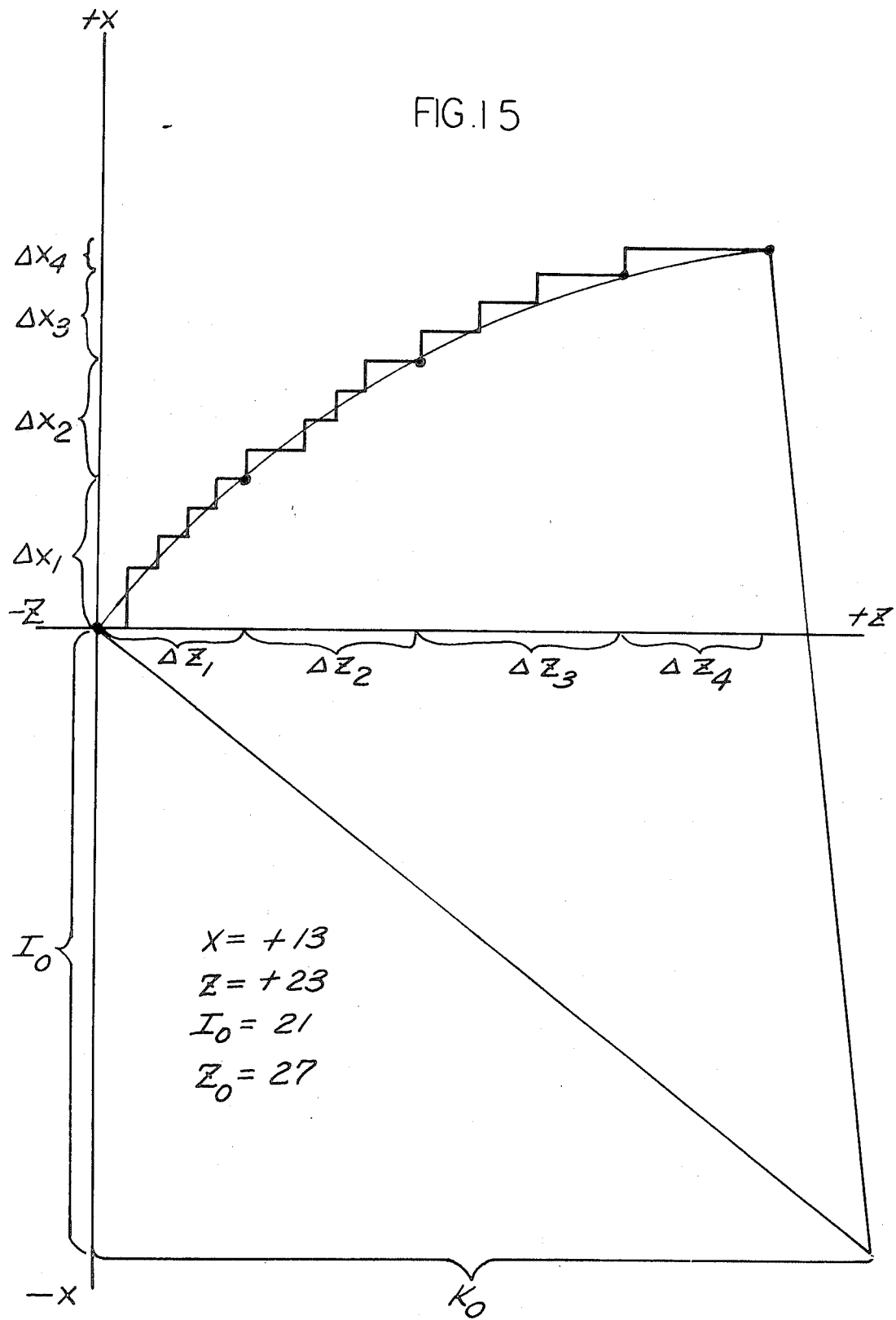
FIG. 15 is a graphical representation of a circle arc generated by the coarse interpolator of the present invention.

The most significant digit of the D register indicates the sign of D. It will be noted in Table II that this digit has gone from 0 to 1. This causes the steering logic to steer the next count-clock pulse to X and I and to gate the I register to the interpolator adder during the next add pulse. As shown in Table II, the third count pulse will be directed to I and X because after the second add pulse, the sign of D was still negative. After the third add pulse, the sign of D is once again positive, as indicated by the zero level of the most significant digit. Therefore, K and Z will again be counted and K gated to the interpolator adder. This process will continue until either X or Z is zero, or because 1's complements are being used, until the X register or the Z register holds all 1's. It will be seen from FIG. 15 and Table II that the coarse interpolator of the present invention accomplishes the step-by-step graphical integration described elsewhere in the specification. Linear interpolation would proceed in the same manner as described above, except that the LIN signal in the steering logic would prevent the I and K registers from being counted, thereby generating a straight line of constant slope.

In Table II, I/C, indicates initial condition, K/C and I/C indicate K count and I count, respectively, while K/A and I/A indicate K add and I add, respectively.

TABLE II

|  | I | K | X | Z | ΔX | ΔZ | D |
|---|---|---|---|---|---|---|---|
| I/C₁ | 010101 | 100100 | 110010 | 101000 | 000000 | 000000 | 000000 |
| K/C |  | 100101 |  | 101001 |  | 000001 | 100101 |
| K/A |  |  |  |  |  |  | 100101 |
| I/C | 010110 |  | 110011 |  | 000001 |  | 010110 |
| I/A |  |  |  |  |  |  | 111011 |
| I/C | 010111 |  | 110100 |  | 000010 |  | 010111 |
| I/A |  |  |  |  |  |  | 010010 |
| K/C |  | 100110 |  | 101010 |  | 000010 | 100110 |
| K/A |  |  |  |  |  |  | 111000 |
| I/C | 011000 |  | 110101 |  | 000011 |  | 011000 |
| I/A |  |  |  |  |  |  | 010000 |
| K/C |  | 100111 |  | 101011 |  | 000011 | 100111 |
| K/A |  |  |  |  |  |  | 110111 |
| I/C | 011001 |  | 110110 |  | 000100 |  | 011001 |
| I/A |  |  |  |  |  |  | 010000 |
| K/C |  | 101000 |  | 101100 |  | 000100 | 101000 |
| K/A |  |  |  |  |  |  | 111000 |
| I/C | 011010 |  | 110111 |  | 000101 |  | 011010 |
| I/A |  |  |  |  |  |  | 010010 |
| K/C |  | 101001 |  | 101101 |  | 000101 | 101001 |
| K/A |  |  |  |  |  |  | 111011 |
| First segment completed |  |  |  |  |  |  |  |
| I/C₂ | 011011 |  | 111000 |  | 000001 |  | 011011 |
| I/A |  |  |  |  |  |  | 010110 |
| K/C |  | 101010 |  | 101110 |  | 000001 | 101010 |
| K/A |  |  |  |  |  |  | 000000 |
| K/C |  | 101011 |  | 101111 |  | 000010 | 101011 |
| K/A |  |  |  |  |  |  | 101011 |
| I/C | 011100 |  | 111001 |  | 000010 |  | 011100 |
| I/A |  |  |  |  |  |  | 000111 |
| K/C |  | 101100 |  | 110000 |  | 000011 | 101100 |
| K/A |  |  |  |  |  |  | 110011 |
| I/C | 011101 |  | 111010 |  | 000011 |  | 011101 |

Table II—Continued

| | I | K | X | Z | ΔX | ΔZ | D |
|---|---|---|---|---|---|---|---|
| I/A | | | | | | | 010000 |
| K/C | | 101101 | | 110001 | | 000100 | 101101 |
| K/A | | | | | | | 111101 |
| I/C | 011110 | | 111011 | | 000100 | | 011110 |
| I/A | | | | | | | 011011 |
| K/C | | 101110 | | 110010 | | 000101 | 101110 |
| K/A | | | | | | | 001001 |
| K/C | | 101111 | | 110011 | | 000110 | 101111 |
| K/A | | | | | | | 111000 |

Second segment completed

| | I | K | X | Z | ΔX | ΔZ | D |
|---|---|---|---|---|---|---|---|
| I/C₃ | 011111 | | 111100 | | 000001 | | 011111 |
| I/A | | | | | | | 010111 |
| K/C | | 110000 | | 110100 | | 000001 | 110000 |
| K/A | | | | | | | 000111 |
| K/C | | 110001 | | 110101 | | 000010 | 110001 |
| K/A | | | | | | | 111000 |
| I/C | 100000 | | 111101 | | 000010 | | 100000 |
| I/A | | | | | | | 011000 |
| K/C | | 110010 | | 110110 | | 000011 | 110010 |
| K/A | | | | | | | 001010 |
| K/C | | 110011 | | 110111 | | 000100 | 110011 |
| K/A | | | | | | | 111101 |
| I/C | 100001 | | 111110 | | 000011 | | 100001 |
| I/A | | | | | | | 011110 |
| K/C | | 110100 | | 111000 | | 000101 | 110100 |
| K/A | | | | | | | 010010 |
| K/C | | 110101 | | 111001 | | 000110 | 110101 |
| K/A | | | | | | | 000111 |
| K/C | | 110110 | | 111010 | | 000111 | 110110 |
| K/A | | | | | | | 111101 |

Third segment completed

| | I | K | X | Z | ΔX | ΔZ | D |
|---|---|---|---|---|---|---|---|
| I/C₄ | 100010 | | 111111 | | 000001 | | 100010 |
| I/A | | | | | | | 011111 |
| K/C | | 110111 | | 111011 | | 000001 | 110111 |
| K/A | | | | | | | 010110 |
| K/C | | 111000 | | 111100 | | 000010 | 111000 |
| K/A | | | | | | | 001110 |
| K/C | | 111001 | | 111101 | | 000011 | 111001 |
| K/A | | | | | | | 000111 |
| K/C | | 111010 | | 111110 | | 000100 | 111010 |
| K/A | | | | | | | 000001 |
| K/C | | 111011 | | 111111 | | 000101 | 111011 |

Arc completed

The constant chord length feature of the present invention is generally provided by the integrator adder 158 and the L² register 159. Each time the X register is counted, the ΔX register is counted. Each time the Z register is counted, the ΔZ register is counted. The ΔX and ΔZ registers are reset to zero at the beginning of each interpolation cycle. It was shown in the mathematical derivation that constant chord length could be generated by generating the sum $(\Delta X)^2 + (\Delta Z)^2$ and stopping the interpolation when this sum reached the predetermined value of $L^2$. The interpolator of the present invention accomplishes this result in a slightly modified manner. Rather than generating the sum and comparing it to a value stored in another register, the value of $L^2$ is preset into the $L^2$ register. Then, instead of adding $2\Delta X - 1$ or $2\Delta Z - 1$, the quantity $2\overline{\Delta X} + 1$ or $2\overline{\Delta Z} + 1$ is added. This procedure accomplishes approximately the same result and does so with fewer storage and gating devices.

Although, as noted elsewhere, any value desired could be generated by the softwear and loaded into the $L^2$ register, the interpolator of the present invention is adapted to provide three different chord lengths: L1, L2 and L3. L1 is 15 control increments long, L2 is 31 control increments long, and L3 is 255 control increments long, Thus, $L^2$ may have the values 225, 961, or 65,025. Referring to FIG. 14, there is shown a somewhat detailed representation of the $L^2$ register 159. This register has 16 stages and, as illustrated, holds the least significant bit in the left-most stage 195 and the most significant bit in the right-most stage 197. The L1, L2 and L3 signals are logically combined by two OR gates 199 to provide a D2 and a D4 signal. The L1, L2 and L3 signals are relabeled D1, D3 and D5, respectively. The D signals are connected as shown in FIG. 14 to the preset steering inputs of the sixth through 16th stages of the $L^2$ register 159. The steering input of the first stage is permanently connected to a logic 1 level and the steering inputs of the second through fifth stages are permanently connected to a logic 0 level. Inspection of this logic diagram will show that when L1 is selected, binary 225 will be presented to the steering inputs of the $L^2$ register. When L2 is selected, binary 961 will be presented to the steering of the $L^2$ register. When L3 is selected, binary 65,025 will be presented to the steering inputs.

Because a complete example demonstrating the chord length generation, even for a chord length of 15 units would be very lengthy, for illustrative purposes, a chord length of eight units will be used, making $L^2$ equal to 64. Binary 64 is 1000000.

It was stated earlier that the interpolator of the present invention carries out approximately the same mathematical summation as that shown in the mathematical deriviation for generating constant chord length. This is because the interpolator of the present invention fails to generate the initial 1 of the summation series 1, 3, 5, 7, –, $2n-1$. Instead, it generates the series 3, 5, 7, 9, –, $2n-1$. This means that the constant chord length generating portion of the coarse interpolator, by skipping the initial 1 in the series, is generating the sum of the squares of ΔX and ΔZ one step ahead of the actual ΔX and ΔZ. Therefore, the value of $L^2$ preset into the $L^2$ register will be reduced to zero and the sign of the register go negative one or two control increments before $(\Delta X)^2 + (\Delta Z)^2 = L^2$. In fact, because the summation is one step ahead in each axis, it works out that the integrator adder will change sign when $(\Delta X)^2 + (\Delta Z)^2 = (L-1)^2$. Thus, if the $L^2$ register is preset to 225, chord length will be limited to 14 control increments rather than 15. If the $L^2$ register is preset to 64, the chord length will be limited to seven units. The operation of the constant chord length portion of the coarse interpolator is illustrated in Table III, which shows the values of $\overline{\Delta X}$, $\overline{\Delta Z}$, and $L^2$ at each step of the interpolation that is illustrated in Table II and FIG. 15.

Referring now to Table III, it will be seen that the $L^2$ register has been preset to binary 64, and because ΔX and ΔZ are zero, $\overline{\Delta X}$ and $\overline{\Delta Z}$ are all 1's. For convenience of illustration, $\overline{\Delta X}$ and $\overline{\Delta Z}$ are illustrated as having only 4 binary digits. The least significant, or 2⁰ digit, is shown at the right in Table III. As shown in FIG. 13, the ΔX and ΔZ stages are connected one stage higher to the integrator adder such that the 2⁰ bit of $\overline{\Delta X}$ or $\overline{\Delta Z}$ is connected to the 2¹ stage of the integrator adder and so forth, and the 2⁰ stage is connected to a logic 1 level as are the stages more significant than those connected to ΔX or ΔZ. This is indicated in Table III by the 1's enclosed in boxes. Thus, when $\overline{\Delta Z}$ = 1110, the value being presented to the integrator adder for addition to the prior value of $L^2$ is 11111101. The first three 1's and the last 1, enclosed in boxes, are provided by the permanent wiring.

TABLE III

|  | 1 1 1 ΔX 1 | 1 1 1 ΔZ 1 | Int. Sign | $L^2$ | $L^2$ |
|---|---|---|---|---|---|
| I/C | 1111 | 1111 |  | 0 1 0 0 0 0 0 0 | 64 |
| Count Z |  | 1110 |  | 1 1 1 1 1 1 0 1 |  |
| Add (2ΔZ+1) |  |  | 1 | 0 0 1 1 1 1 0 1 | 61 |
| Count X | 1110 |  |  | 1 1 1 1 1 1 0 1 |  |
| Add (2ΔX+1) |  |  | 1 | 0 0 1 1 1 0 1 0 | 58 |
| Count X | 1101 |  |  | 1 1 1 1 1 0 1 1 |  |
| Add (2ΔX+1) |  |  | 1 | 0 0 1 1 0 1 0 1 | 53 |
| Count Z |  | 1101 |  | 1 1 1 1 1 0 1 1 |  |
| Add (2ΔZ+1) |  |  | 1 | 0 0 1 1 0 0 0 0 | 48 |
| Count X | 1100 |  |  | 1 1 1 1 1 0 0 1 |  |
| Add (2ΔX+1) |  |  | 1 | 0 0 1 0 1 0 0 1 | 41 |
| Count Z |  | 1100 |  | 1 1 1 1 1 0 0 1 |  |
| Add (2ΔZ+1) |  |  | 1 | 0 0 1 0 0 0 1 0 | 34 |
| Count X | 1011 |  |  | 1 1 1 1 0 1 1 1 |  |
| Add (2ΔX+1) |  |  | 1 | 0 0 0 1 1 0 0 1 | 25 |
| Count Z |  | 1011 |  | 1 1 1 1 0 1 1 1 |  |
| Add (2ΔZ+1) |  |  | 1 | 0 0 0 1 0 0 0 0 | 16 |
| Count X | 1010 |  |  | 1 1 1 1 0 1 0 1 |  |
| Add (2ΔX+1) |  |  | 1 | 0 0 0 0 0 1 0 1 | 5 |
| Count Z |  | 1010 |  | 1 1 1 1 0 1 0 1 |  |
| Add (2ΔZ+1) |  |  | 0 | 1 1 1 1 1 0 1 0 | −6 |
| I/C | 1111 | 1111 |  | 0 1 0 0 0 0 0 0 | 64 |
| Count X | 1110 |  |  | 1 1 1 1 1 1 0 1 |  |
| Add (2ΔX+1) |  |  | 1 | 0 0 1 1 1 1 0 1 | 61 |
| Count Z |  | 1110 |  | 1 1 1 1 1 1 0 1 |  |
| Add (2ΔZ+1) |  |  | 1 | 0 0 1 1 1 0 1 0 | 58 |
| Count Z |  | 1101 |  | 1 1 1 1 1 0 1 1 |  |
| Add (2ΔZ+1) |  |  | 1 | 0 0 1 1 0 1 0 1 | 53 |
| Count X | 1101 |  |  | 1 1 1 1 1 0 1 1 |  |
| Add (2ΔX+1) |  |  | 1 | 0 0 1 1 0 0 0 0 | 48 |
| Count Z |  | 1100 |  | 1 1 1 1 1 0 0 1 |  |
| Add (2ΔZ+1) |  |  | 1 | 0 0 1 0 1 0 0 1 | 41 |
| Count X | 1100 |  |  | 1 1 1 1 1 0 0 1 |  |
| Add (2ΔX+1) |  |  | 1 | 0 0 1 0 0 0 1 0 | 34 |
| Count Z |  | 1011 |  | 1 1 1 1 0 1 1 1 |  |
| Add (2ΔZ+1) |  |  | 1 | 0 0 0 1 1 0 0 1 | 25 |
| Count X | 1011 |  |  | 1 1 1 1 0 1 1 1 |  |
| Add (2ΔX+1) |  |  | 1 | 0 0 0 1 0 0 0 0 | 16 |
| Count Z |  | 1010 |  | 1 1 1 1 0 1 0 1 |  |
| Add (2ΔZ+1) |  |  | 1 | 0 0 0 0 0 1 0 1 | 5 |
| Count Z |  | 1001 |  | 1 1 1 1 0 0 1 1 |  |
| Add (2ΔZ+1) |  |  | 0 | 1 1 1 1 1 0 0 0 |  |
| I/C | 1111 | 1111 |  | 0 1 0 0 0 0 0 0 | 64 |
| Count X | 1110 |  |  | 1 1 1 1 1 1 0 1 |  |
| Add (2ΔX+1) |  |  | 1 | 0 0 1 1 1 1 0 1 | 61 |
| Count Z |  | 1110 |  | 1 1 1 1 1 1 0 1 |  |

TABLE III—Continued

| | 1 1 1 ΔX 1 | 1 1 1 ΔZ 1 | Int. Sign | L² | L₂ |
|---|---|---|---|---|---|
| Add (2ΔZ+1) | | | 1 | 0 0 1 1 1 0 1 0 | 58 |
| Count Z | | 1101 | | 1 1 1 1 1 0 1 1 | |
| Add (2ΔZ+1) | | | 1 | 0 0 1 1 0 1 0 1 | 53 |
| Count X | 1101 | | | 1 1 1 1 1 0 1 1 | |
| Add (2ΔX+1) | | | 1 | 0 0 1 1 0 0 0 0 | 48 |
| Count Z | | 1100 | | 1 1 1 1 1 0 0 1 | |
| Add (2ΔZ+1) | | | 1 | 0 0 1 0 1 0 0 1 | 41 |
| Count Z | | 1011 | | 1 1 1 1 0 1 1 1 | |
| Add (2ΔZ+1) | | | 1 | 0 0 1 0 0 0 0 0 | 32 |
| Count X | 1100 | | | 1 1 1 1 1 0 0 1 | |
| Add (2ΔX+1) | | | 1 | 0 0 0 1 1 0 0 1 | 25 |
| Count Z | | 1010 | | 1 1 1 1 0 1 0 1 | |
| Add (2ΔZ+1) | | | 1 | 0 0 0 0 1 1 1 0 | 14 |
| Count Z | | 1001 | | 1 1 1 1 0 0 1 1 | |
| Add (2ΔZ+1) | | | 1 | 0 0 0 0 0 0 0 1 | 01 |
| Count Z | | 1000 | | 1 1 1 1 0 0 0 1 | |
| Add (2ΔZ+1) | | | 0 | 1 1 1 1 0 0 1 0 | |
| I/C | 1111 | 1111 | | 0 1 0 0 0 0 0 0 | |
| Count Z | | 1110 | | 1 1 1 1 1 1 0 1 | |
| Add (2ΔZ+1) | | | 1 | 0 0 1 1 1 1 0 1 | |
| Count Z | | 1101 | | 1 1 1 1 1 0 1 1 | |
| Add (2ΔZ+1) | | | 1 | 0 0 1 1 1 0 0 0 | |
| Count Z | | 1100 | | 1 1 1 1 1 0 0 1 | |
| Add (2ΔZ+1) | | | 1 | 0 0 1 1 0 0 0 1 | |
| Count Z | | 1011 | | 1 1 1 1 0 1 1 1 | |
| Add (2ΔZ+1) | | | 1 | 0 0 1 0 1 0 0 0 | |
| Count Z | | 1010 | | 1 1 1 1 0 1 0 1 | |
| Add (2ΔZ+1) | | | 1 | 0 0 0 1 1 1 0 1 | |

As noted earlier, the carry output of the integrator adder carry out provides the INT SIGN signal. So long as the INT SIGN signal is at logic 1, interpolation will continue. However, when the INT SIGN signal changes to logic 0, an end interpolate signal END INT. is generated by an inverter 201 and an OR gate 202 register from state two to state three, thereby stopping the interpolator count clock and add clock pulses immediately following the next add clock pulse. In the illustrated example, the INT.SIGN goes from one to zero the fifth time ΔZ is counted. This ends the cycle of interpolation as noted above and the values existing in the G, I, K, X, Z, and D registers 146 are transferred back to core memory in the computer. The values in the ΔX and ΔZ registers are transferred to the proper interpolator output buffer 61 for transmission to the appropriate machine tool control by the data link. When the next up-date request is received for contouring information for the same axis pair, these values will be transferred from computer core storage back to the coarse interpolator registers 146 and interpolation will be resumed. Only the ΔX, ΔZ, and L² registers are reset to zero each time. On the second cycle, interpolation will continue as shown in Table III until Z is counted the sixth time and added, whereupon the balances remaining in each of the registers 146 is transferred back to computer core memory. The third cycle of interpolation for this particular example is terminated after Δ Z has been counted seven times.

The fourth cycle of interpolation is not terminated because of chord length. Rather, it is terminated because X and Z have been reduced to zero. It will be noted with reference to Table II, the fourth cycle of interpolation of the illustrated example, that X is counted once and then Z is counted five times. The D register sign normally will properly steer the count pulses to either the I or the K register to correctly interpolate the desired arc. When, however, either X or Z becomes zero (the complement all ones), all pulses will be routed to the other register. Therefore, because the first add pulse in the fourth cycle of interpolation in the illustrated example "used up" the X dimension making the X register hold all 1's, all succeeding pulses are gated to the Z register until the Z register holds all 1's, or until the INT SIGN changes to stop the integration. In any event, when both the X and Z registers hold all 1's, indicating that X is zero and Z is zero, both XO and ZO will be at logic 1 and through an AND gate 203 will be generating an end-of-block signal, EOB, as well as an END INT. signal through OR gate 202. The end interpolate signal END INT. counts the state register to state three to end the interpolation as described above and the end-of-block signal EOB is made available to the data link. This completes interpolation of the clockwise arc shown in FIG. 15.

There is one portion of the data link equipment, as is illustrated in FIG. 16, located at the central control for each machine tool in the system. If the machine tool is only a 2-axis machine tool, no provisions need be made for processing ΔU and ΔW. However, for a complete description of the invention, the data link for a 4-axis machine tool will be described. Therefore, the interpolator output buffer 61 is shown with a ΔX buffer 207, a ΔZ buffer 209, a ΔU buffer 211, and a ΔW buffer 213. Each buffer comprises an 8-bit register 214 and a flag 215 that is set when its associated register is strobed.

Data flowing from the central control to the machine tool control or display associated with the machine tool control can originate from two sources, the coarse interpolator 26 or the computer 21. Up-date information from the coarse interpolator is routed to the proper interpolator output buffer 61 by the device counter 59. It will be recalled that the device counter is held at the count where an up-date request flag is found, and remains there until the interpolation cycle is complete. The up-date information is strobed into the interpolator output buffers by the INT. A STROBE signal or the INT. B STROBE signal, the former being used to load ΔX and ΔZ information into the interpolator output buffers and the latter being used to load ΔU and ΔW information into the interpolator output buffers.

Also shown in FIG. 16 is the computer output buffer 217 for the particular machine tool and it also comprises an eight-bit register 214 and a flip-flop flag 215. The preset strobe signal to the computer output buffer 217 is IOP4 steered by the device selector output line 47, according to the device code from the I/O channel.

Each of the registers 214 of the interpolator output buffers and the computer output buffer are connected through a gating matrix 221 to the preset steering inputs of a presettable shift register 225 called the line buffer. Data is strobed into the line buffer in parallel and is stepped out serially by a shift clock signal. The line buffer is also used to receive data from the machine tool control 31 and keyboard and display 32. Thus, as data being transmitted to the machine tool control 31 or keyboard and display 32 is stepped out of the line buffer, data from the machine tool control or keyboard and display may be stepped in. When the line buffer 225 has been completely shifted, the just-received data, steered by data recognition gates 227, is strobed into the computer input buffer 217 and sets its flag 215. If the just-received data is an up-date request, it is steered by the data recognition gates to set the proper up-date request flag.

The data link operates on a 20-bit cycle generated by the clock as shown in FIG. 9 and illustrated in FIG. 10E. In the preferred embodiment, six transfer pulses are used. These are labeled TP1, TP2, TP3, TP4, TP5 and TP6. The transfer pulses each have a duration of five microseconds and are time displaced so that TP2 follows TP1, and TP3 follows TP2. Following TP3, the shift-enable signal lasts for 65 microseconds and is immediately followed by TP4, TP5, and TP6. TP6 is followed by a synchronizing pulse SYNC that keeps the digital clock of the machine tool control in synchronism with the master clock of the central control. The shift clock pulses are 0.5 microseconds in duration and occur during the last 0.5 microseconds of the transfer pulses. That is, transfer pulse TP1 will be at logic 1 for 4.5 microseconds before the shift clock pulse occurs. This provides for the logic gates to settle down before the registers and flags are strobed by the shift clock pulses.

Data is transferred in a 13-bit format. Bits 1–4 and 5–9 carry the data from the interpolator output buffer or the computer output buffer. Bits 5 and 10 are available for use as parity bits. Bits 11–13 are used to identify the destination of the data carried in bits 1–10. It is bits 11–13 that are used by the data recognition gates 227 to steer received data to the proper buffer or flag. FIG. 16 shows the logic diagram for generating bits 11–13. The coding used to identify the data is shown in Table IV.

TABLE IV

|  | Bit 11 | Bit 12 | Bit 13 |
|---|---|---|---|
| ΔXA | 0 | 1 | 0 |
| ΔZA | 0 | 0 | 1 |
| ΔUA | 1 | 1 | 0 |
| ΔWA | 1 | 0 | 1 |
| CPUA | 1 | 0 | 0 |
| LAST ΔXA | 0 | 1 | 1 |
| LAST ΔUA | 1 | 1 | 1 |

As noted earlier, each output buffer has an associated flip-flop flag 215 that is set when data is loaded into its associated register 214. The set outputs of these flags are all connected to a priority tree circuit 231 that determines the priority of transmission of data. Transfer pulse TP2 is steered through the priority tree by the set outputs of the flip-flop flags 215 to set one of five priority flip-flops 217. The set outputs of the priority flip-flops 217 are labeled ΔXA, ΔZA, ΔUA, ΔWA and CPUA. Only one of the priority flip-flops may be in the set state at a given time. This is because all the priority flip-flops 217 are reset by TP6 on each data link cycle, and only one can be set by TP2 on the next data link cycle — the one having the highest priority. Therefore, only one priority signal ΔXA, ΔZA, ΔUA, ΔWA, or CPUA, may be at logic 1 at any given time. The priority signals are used to gate the proper buffer register 214 to the steering inputs of the line buffer 225. Data from the gated register is strobed into the line buffer by a shift clock pulse gated by TP3 through an AND gate 233. Also strobed into the line buffer during TP3 are the identification bits 11, 12 and 13, which are formed by logical combination of the priority signals and the end-of-block signal, EOB, as shown in FIG. 16, and the parity bits 5 and 10.

Data is transmitted over a telephone pair having a line 1 and a line 2, connected to AND gates 237 and 239, respectively. Gating logic 241 connected to AND gates 237 and 239, as shown in FIG. 16, is such that line 1 will be under control of the left-most stage of the line buffer 225 during the SHIFT-ENABLE signal, being positive with respect to line 2 when the left-most stage is at logic 1. When the SHIFT-ENABLE signal is not present, line 1 will be under control of the XMT NON-DATA terminal. Not withstanding the level of any other signals, when the SYNC signal is present, line 2 is made positive with respect to line 1. This arrangement provides for transmitting a non-ambiguous SYNC signal to the machine control clock and for transmitting a parity check/back via the XMI non-data terminal when the SHIFT-ENABLE signal is not present.

As the 13 bits stored in the line buffer at the central control are shifted out, 13 bits of data are being shifted into the central control line buffer as received from the machine tool control. After the 13th shift, the SHIFT-ENABLE signal goes from logic 1 to logic 0 and TP4 occurs. During TP4, the data recognition gates 227 are active and analyze bits 11, 12 and 13 to determine whether the data is for the coarse interpolator or for the computer. If the data is for the coarse interpolator, all the received information will be included in bits 11, 12 and 13. That is, it will be a simple up-date request for the side turret axis pair or for the end turret axis pair. This will generate either an up-date request A or an up-date request B. If the received data is for the computer, the data recognition gates will enable the computer input buffer to be strobed by the shift clock during TP4. This will also set the computer input buffer flag which will cause a skip request to be sent to the I/O channel of the computer when the device code of the set buffer is outputted by the computer, as described earlier.

The data link circuits at each machine tool control are substantially the same as those at the central control, as shown in FIG. 16. The data link receiver is a differential amplifier and its output is connected directly to an AND gate 241 that responds to received data signals. The output of the differential amplifier at each machine control 31 is also connected through an inverter amplifier 243 to a second AND gate 245 which responds only to the SYNC signal and does not respond to transmitted data. This received SYNC signal is then available to keep the oscillator of the local digital clock at the machine tool control in synchronism with the master clock at the central control.

FIG. 17 briefly shows the linear interpolator and servo-drive of the machine tool control, which is generally the same as presently used with punched paper tape controlled machine tools. A feed-rate oscillator 247 generates feed-rate pulses at a fixed rate. These are divided by a binary rate multiplier 251 under the control of a feed-rate number F stored in a register 253 coupled to the binary rate multiplier 251. The output of binary rate multiplier 251 determines the feedrate of the tool driven by the X and Z axes. A similar binary rate multiplier (not shown) serves the U and W axes, which are substantially the same as the X and Z axes. Binary rate multiplier 251 provides the input to two other binary rate multipliers 257 and 259, one for each axis of the axis pair being controlled, in this case X and Z. Each of these binary rate multipliers has a multiplier register associated with it, one labeled ΔX active and one labeled ΔZ active. The outputs of binary rate multipliers 257 and 259 supply pulses to the pulses responsive servo systems of the two axes. The X-axis servo system 261 is shown diagrammatically. The Z-axis servo system (not shown) is substantially the same as the servo system for the X-axis.

Each piece of data required by the machine tool control 31 is received via the data link and routed by data recognition gates 227 to the proper machine control buffer register, such as the F-number buffer 265, the ΔX buffer 267 or the ΔZ buffer 269. A command complete circuit generates a transfer pulse T when each ΔX and ΔZ command is executed to transfer the next ΔX and ΔZ command from buffer storage to active storage, and generate an up-date request signal that will cause the central control to generate another ΔX and ΔZ command.

When the data recognition gates 227 of the data link at the machine tool control 31 detect a LAST ΔX or a LAST ΔU, a new block request is generated. This is sent via the data link to the computer, which makes the next block of data available to the machine tool control 31 and to the coarse interpolator if contouring is included in the block.

What is claimed is:

1. A control system for controlling a plurality of machines to effect movement in each machine of first and second members along orthogonal axes to effect relative motion of a tool and workpiece along desired curves, each machine including means for moving said members along said orthogonal axes in response to component signals representing vector components of straight line segments closely approximating portions of said curves with respect to said orthogonal axes, said system comprising data processing means comprising a programmable digital computer having storage means for storing for each of said machines parametric data defining desired curves, an interpolator for generating from parametric data defining a desired curve component signals representing vector components of straight line segments closely approximating a portion of said desired curve and for modifying the parametric data to provide modified parametric data defining the remainder of the desired curve, and means for transferring parametric data for the desired curve from said computer to said interpolator and for transferring said modified parametric data from said interpolator to said computer, and means responsive to a request from one of said machines for effecting a transfer of parametric data defining a desired curve from said computer to said interpolator and for transmitting said component signals to the requesting machine.

2. In a system as defined in claim 1 wherein said interpolator comprises means for terminating the generation of said component signals when the line segment defined thereby is of a preselected length.

3. In a system as defined in claim 2 wherein said interpolator comprises first and second register means for accumulating first and second incremental changes along respective ones of said orthogonal axes during interpolation and third means responsive to the incrementation of said first and second register means for determining the length of the line segment represented by said component signals and for limiting the length thereof of said preselected values.

4. In a system as defined in claim 1 wherein said storage means of said digital computer stores programs for execution by said machines, said programs including coded commands for controlling various functions of said machines independently of said interpolator and said system includes means for transmitting said coded commands to a machine upon request.

5. A control system as defined in claim 4 wherein said storage means comprises an active storage and auxiliary memory means, said programs being stored in said auxiliary memory means, said computer including means for transferring portions of a program from said auxiliary memory means to said active storage when the program is requested by a machine, and means responsive to the execution of a portion of a program in said active storage to transfer a subsequent portion of the program to said active storage.

6. A control system as defined in claim 3 wherein said interpolator comprises a length register for storing a number representing the sum of the squares of the absolute values of the displacements defined by the component signals being derived, and means for decrementing the number in said length register by the value 2(delta A)+1 for each incremental change in said first and second register means where delta A is the cumulative displacement for the register means incremented and means for terminating said interpolation when said length register is decremented to zero.

7. A control system as defined in claim 1 wherein said storage means comprises an active storage and auxiliary memory means for storing programs to be executed by said machines comprising coded parametric data, said computer including means for transferring portions of a program from said auxiliary memory means to said active storage when the program is requested by a machine, and means responsive to the execution of a portion of a program in said active storage to transfer a subsequent portion of the program to said active storage.

8. In a system for interpolating parametric data defining a curve extending between a beginning point and a terminating point to provide successive sets of component signals representing first and second components with respect to orthogonally related axes for defining successive linear segments closely approximating said curve, interpolating means for incrementally deriving the displacements along said axes for said components and registering the cumulative displacements along said axes for said components and means responsive to said cumulative displacements for limiting the length of each of said linear segments comprising means for computing the length of the segment defined by said components and terminating the interpolation when said length is equal to a preselected length.

9. A system for interpolation as defined in claim 8 wherein means for computing said length of said segments comprises a register having stored therein a number corresponding to the sum of the square of the displacements along said components for providing said segment of preselected length and means for decrementing said register by the factor 2(delta A)+1 each time an increment of movement along an axis is accumulated during the interpolation where A is the total cumulative change during interpolation along the respective axis.

* * * * *